US012210872B2

(12) United States Patent
Charfi et al.

(10) Patent No.: US 12,210,872 B2
(45) Date of Patent: *Jan. 28, 2025

(54) NEURAL PROCESSING DEVICE, PROCESSING ELEMENT INCLUDED THEREIN AND METHOD FOR OPERATING VARIOUS FORMATS OF NEURAL PROCESSING DEVICE

(71) Applicant: Rebellions Inc., Seongnam-si (KR)

(72) Inventors: Karim Charfi, Seongnam-si (KR); Jinwook Oh, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,924

(22) Filed: Mar. 12, 2024

(65) Prior Publication Data
US 2024/0220246 A1 Jul. 4, 2024

Related U.S. Application Data

(63) Continuation of application No. 18/459,241, filed on Aug. 31, 2023, now Pat. No. 11,954,488.

(30) Foreign Application Priority Data

Sep. 5, 2022 (KR) .................. 10-2022-0112360

(51) Int. Cl.
*G06F 9/30* (2018.01)
*G06F 9/38* (2018.01)

(52) U.S. Cl.
CPC ........ *G06F 9/30025* (2013.01); *G06F 9/3001* (2013.01); *G06F 9/30098* (2013.01)

(58) Field of Classification Search
CPC .. G06F 9/3001; G06F 9/30025; G06F 9/3853; G06F 7/483; G06F 7/487;
(Continued)

(56) References Cited

U.S. PATENT DOCUMENTS 5,309,383 A * 5/1994 Kuroiwa ............... G06F 7/5375
708/496
11,669,933 B2 * 6/2023 Mellempudi ............ G06T 1/20
345/522
(Continued)

FOREIGN PATENT DOCUMENTS

KR 10-2009-0060207 A 6/2009
KR 10-2258566 B1 6/2021

OTHER PUBLICATIONS

Nannarelli, Alberto (2020). "Variable Precision 16-Bit Floating-Point Vector Unit for Embedded Processors", 2020 IEEE 27th Symposium on Computer Arithmetic (ARITH), pp. 96-102. doi: 10.1109/ARITH48897.2020.00022.

(Continued)

*Primary Examiner* — Jacob Petranek
(74) *Attorney, Agent, or Firm* — BROADVIEW IP LAW, PC

(57) ABSTRACT

A neural processing device, a processing element included therein and a method for operating various formats of the neural processing device are provided. The neural processing device includes at least one neural processor, a shared memory shared by the at least one neural processor, and a global interconnection configured to transmit data between the at least one neural processor and the shared memory, wherein each of the at least one neural processor comprises at least one processing element, each of the at least one processing element receives an input in a first format and thereby performs an operation, and receives an input in a second format that is different from the first format and thereby performs an operation if a format conversion signal is received, and the first format and the second format have a same number of bits.

19 Claims, 28 Drawing Sheets

(58) Field of Classification Search
CPC .. G06F 7/4876; G06F 9/3893; G06F 15/8046;
G06N 3/063
See application file for complete search history.

(56) References Cited

U.S. PATENT DOCUMENTS

| | | | |
|---|---|---|---|
| 2009/0150654 A1 | 6/2009 | Oberman et al. | |
| 2018/0336165 A1* | 11/2018 | Phelps | G06F 17/16 |
| 2020/0279153 A1* | 9/2020 | Fowers | G06F 17/16 |
| 2021/0224069 A1* | 7/2021 | Chen | G06F 9/3001 |
| 2022/0236949 A1 | 7/2022 | Song | |
| 2022/0326911 A1* | 10/2022 | Abe | G06F 7/4876 |
| 2023/0087364 A1* | 3/2023 | Kundu | G06N 3/044 |
| | | | 706/25 |

OTHER PUBLICATIONS

Bruintjes, Tom M. (2011) "Design of a Fused Multiply-Add Floating-Point and Integer Datapath," URL; https://api.semanticscholar.org/CorpusID:18436960.

Office Action for KR 10-2022-0112360 by Korean Intellectual Property Office dated Sep. 9, 2024.

* cited by examiner

| Frs | Pass | Result |
|---|---|---|
| 1 | * | 7FFF |
| 0 | 1 | Rnd-result |
| 0 | 0 | 0 |

| Frs | Pass | Result |
|-----|------|--------|
| 1 | * | 0 |
| 0 | 1 | Rnd-result |
| 0 | 0 | 1 |

NEURAL PROCESSING DEVICE, PROCESSING ELEMENT INCLUDED THEREIN AND METHOD FOR OPERATING VARIOUS FORMATS OF NEURAL PROCESSING DEVICE

CROSS-REFERENCE TO RELATED APPLICATION

This application is a continuation application of U.S. patent application Ser. No. 18/459,241, filed on Aug. 31, 2023, which claims priority under 35 U.S.C § 119 to Korean Patent Application No. 10-2022-0112360 filed on Sep. 5, 2022, in the Korean Intellectual Property Office, the entire contents of which is hereby incorporated by reference.

TECHNICAL FIELD

The disclosure relates to a neural processing device, a processing element included therein, and a method for operating various formats of the neural processing device. More particularly, the disclosure relates to a neural processing device, a processing element included therein, and a method for operating various formats of the neural processing device, which are capable of processing operations of data of various formats rather than one format.

BACKGROUND

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention.

In particular, operations using a floating-point format rather than a fixed-point format may be frequently performed in such a neural processing unit. Such floating-point is used in various formats rather than a single unified format for various reasons, and in order to use these various formats, there may be inconveniences such as separately performing the conversion of the format for operating.

In addition, since the use of various formats requires a configuration for processing for each format, there are problems that the hardware configuration of the entire device becomes complicated and unnecessary redundancy increases.

The description set forth in the background section should not be assumed to be prior art merely because it is set forth in the background section. The background section may describe aspects or embodiments of the disclosure.

SUMMARY

Aspects of the disclosure provide a neural processing device capable of performing operations in various formats via minimal hardware transformation and minimal configuration.

Aspects of the disclosure provide a processing element capable of performing operations in various formats via minimal hardware transformation and minimal configuration.

Aspects of the disclosure provide a method for operating various formats of a neural processing device capable of performing operations in various formats via minimal hardware transformation and minimal configuration.

According to some aspects of the disclosure, a neural processing device includes at least one neural processor, a shared memory shared by the at least one neural processor, and a global interconnection configured to transmit data between the at least one neural processor and the shared memory, wherein each of the at least one neural processor comprises at least one processing element, each of the at least one processing element receives an input in a first format and thereby performs an operation, and receives an input in a second format that is different from the first format and thereby performs an operation if a format conversion signal is received, and the first format and the second format have a same number of bits.

According to some aspects, the first format includes a first sign bit, a first exponent bit, and a first mantissa bit, the second format includes a second sign bit, a second exponent bit, and a second mantissa bit, and a number of bits of the second exponent bit is greater than a number of bits of the first exponent bit.

According to some aspects, the processing element includes an unpacker configured to receive the format conversion signal and extract a sign bit, an exponent bit, and a mantissa bit based on the second format.

According to some aspects, the unpacker extracts the sign bit, the exponent bit, and the mantissa bit based on the first format if the format conversion signal is not received.

According to some aspects, the processing element further includes an aligner configured to receive the exponent bit from the unpacker and generate alignment information for alignment of a third input.

According to some aspects, the processing element further includes a bit manipulation unit configured to generate a multiplied value of mantissa bits of first and second inputs and an adder configured to generate an added value via the multiplied value and the alignment information.

According to some aspects, the processing element further includes a leading zero anticipator configured to generate a leading zero anticipation value via the added value and a normalizer configured to perform a normalization task via the leading zero anticipation value and the added value and thereby generate a final mantissa value.

According to some aspects, the aligner generates an initial exponent value, and the processing element further includes an exponent corrector configured to generate a final exponent value via the format conversion signal and the initial exponent value.

According to some aspects, the adder generates a final sign value, and the processing element further includes an output mux configured to generate a final result via a final mantissa value, the final exponent value, and the final sign value.

According to some aspects of the disclosure, a processing element includes an unpacker configured to receive first to third inputs and thereby separate first to third mantissas and first to third exponents, a bit manipulation unit configured to perform multiplication of the first and second mantissas and thereby generate a multiplied value, an aligner configured to receive the first to third exponents and thereby generate alignment information and an initial exponent value for the third input, an adder configured to generate an added value and a final sign value via the multiplied value and the alignment information, a leading zero anticipator configured to generate a leading zero anticipation value via the added value, a normalizer configured to perform a normalization task of the added value and thereby generate a final mantissa value, an exponent corrector configured to generate a final exponent value via the leading zero anticipation value and the initial exponent value and an output mux configured to generate a final result via the final sign value, the final mantissa value, and the final exponent value, wherein the unpacker, the leading zero anticipator, the normalizer, and the exponent corrector perform operations in a second format that is different from a first format instead of the first format according to reception of a format conversion signal.

According to some aspects, the unpacker detects a case where any one of the first to third inputs is a not-a-number (NaN) and thereby generates not-a-number (NaN) information, and the exponent corrector receives the NaN information and thereby generates the final exponent value.

According to some aspects, the unpacker, the aligner, the normalizer, and the exponent corrector receive the format conversion signal together.

According to some aspects, the final result is a value obtained by performing multiplication of the first input and the second input and performing addition of the multiplied result of the first input and the second input, and the third input.

According to some aspects, a number of bits of the first format is equal to a number of bits of the second format.

According to some aspects, a number of bits of a first exponent bit of the first format is less than a number of bits of a second exponent bit of the second format.

According to some aspects, a number of bits of the first format is 16 bits.

According to some aspects of the disclosure, a method for operating various formats of a neural processing device, includes receiving a format conversion signal for converting from a first format to a second format, separating first to third mantissa bits and first to third exponent bits according to a number of bits of the second format, generating a multiplied value by multiplying the first and second mantissa bits, generating alignment information according to the first and second formats, generating an added value and a final sign value via the alignment information and the multiplied value, generating a leading zero anticipation value via the added value, generating a final mantissa value via the leading zero anticipation value and the added value, generating a final exponent value via the leading zero anticipation value and generating a final result via the final sign value, the final exponent value, and the final mantissa value.

According to some aspects, generating the alignment information includes selecting an input according to the format conversion signal and generating the alignment information according to the selected input.

According to some aspects, generating the final exponent value includes determining a maximum shift according to the format conversion signal and generating the final exponent value according to the maximum shift.

According to some aspects, a number of bits of a first sign bit of the first format and a number of bits of a second sign bit of the second format are equal to each other.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

The neural processing device, the processing element included therein, and the method for operating various formats of the neural processing device of the disclosure can use various formats rather than one format for operations.

In addition, as the entire hardware is not newly designed but only minimal transformation is added by a signal in order to implement all the different formats of the same number of bits, both space efficiency and minimization of power consumption can be promoted.

In addition to the foregoing, the specific effects of the disclosure will be described together while elucidating the specific details for carrying out the embodiments below.

DETAILED DESCRIPTION OF THE PREFERRED EMBODIMENTS

Figure 1:
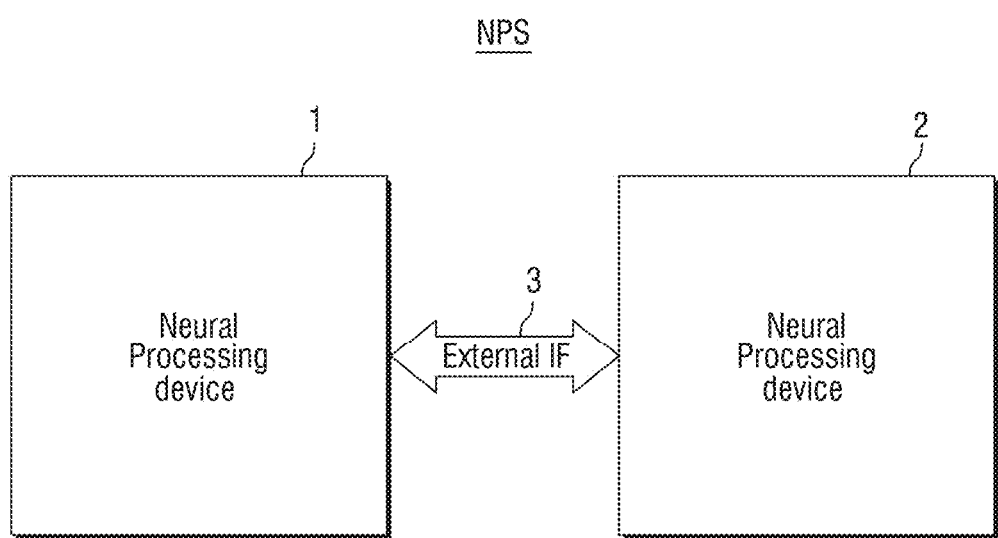
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refer to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, at least one of configuration, procedure, process, method, or the like disclosed in the disclosure may be combined to the extent that they are not technically contradictory to each other.

Hereinafter, a neural processing device in accordance with some embodiments of the disclosure will be described with reference to FIGS. 1 to 25.

FIG. 1 is a block diagram illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. In some embodiments, in a neural processing system NPS, three or more neural processing devices may be connected to each other via the external interface 3. Also, conversely, a neural processing system NPS in accordance with some embodiments may include only one neural processing device.

In some embodiments, each of the first neural processing device 1 and the second neural processing device 2 may be a processing device other than the neural processing device. In some embodiments, each of the first neural processing device 1 and the second neural processing device 2 may be a graphics processing unit (GPU), a central processing unit (CPU), and other types of processing units as well. In the following, the first neural processing device 1 and the second neural processing device 2 will be described as neural processing devices for convenience.

Figure 2:
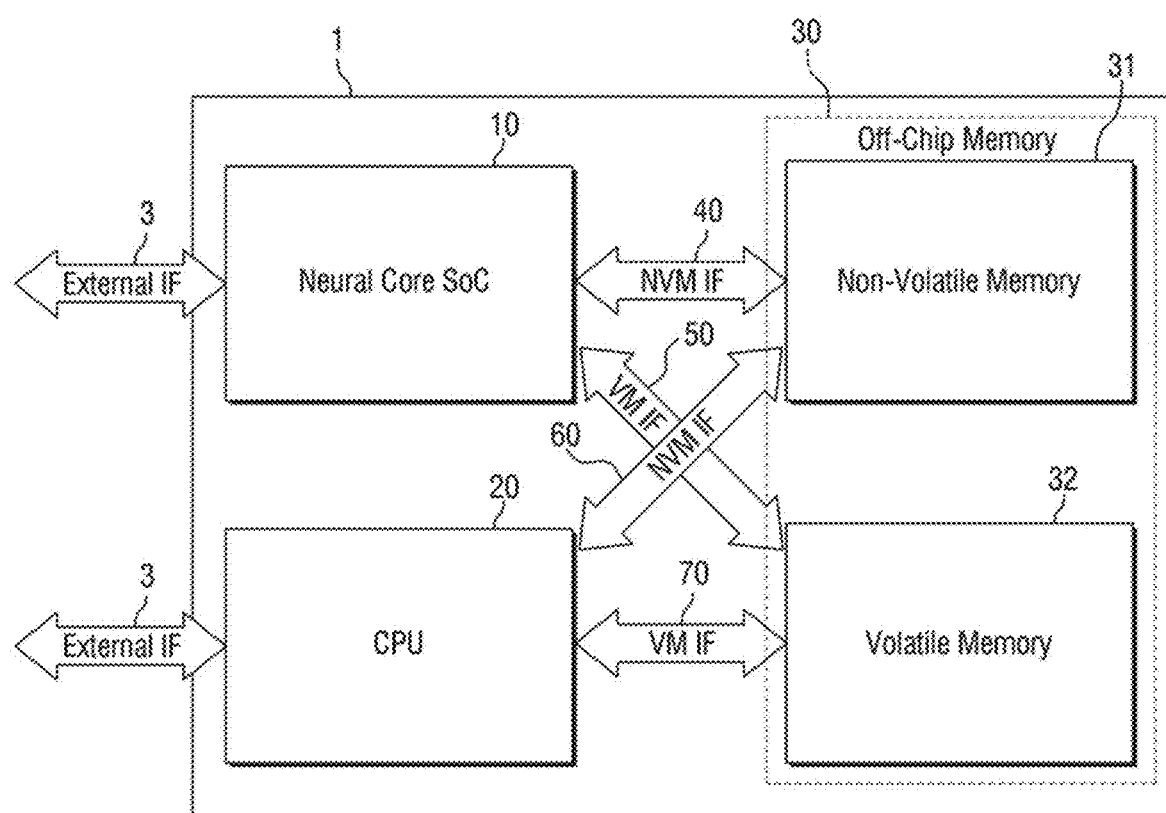
FIG. 2 is a block diagram for illustrating the neural processing device of FIG. 1.

FIG. 2 is a block diagram for illustrating the neural processing device of FIG. 1.

Referring to FIG. 2, a first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 can be an artificial intelligence calculation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are frequently used in deep learning. Accordingly, there can be high efficiency by performing calculations in deep learning inference and training tasks by the neural core SoC 10.

The CPU 20 may exchange data with other external calculation units via the external interface 3. Further, the CPU 20 may be connected to the non-volatile memory 31 and the volatile memory 32 via the second non-volatile memory interface 60 and the second volatile memory interface 70, respectively.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

Figure 3:
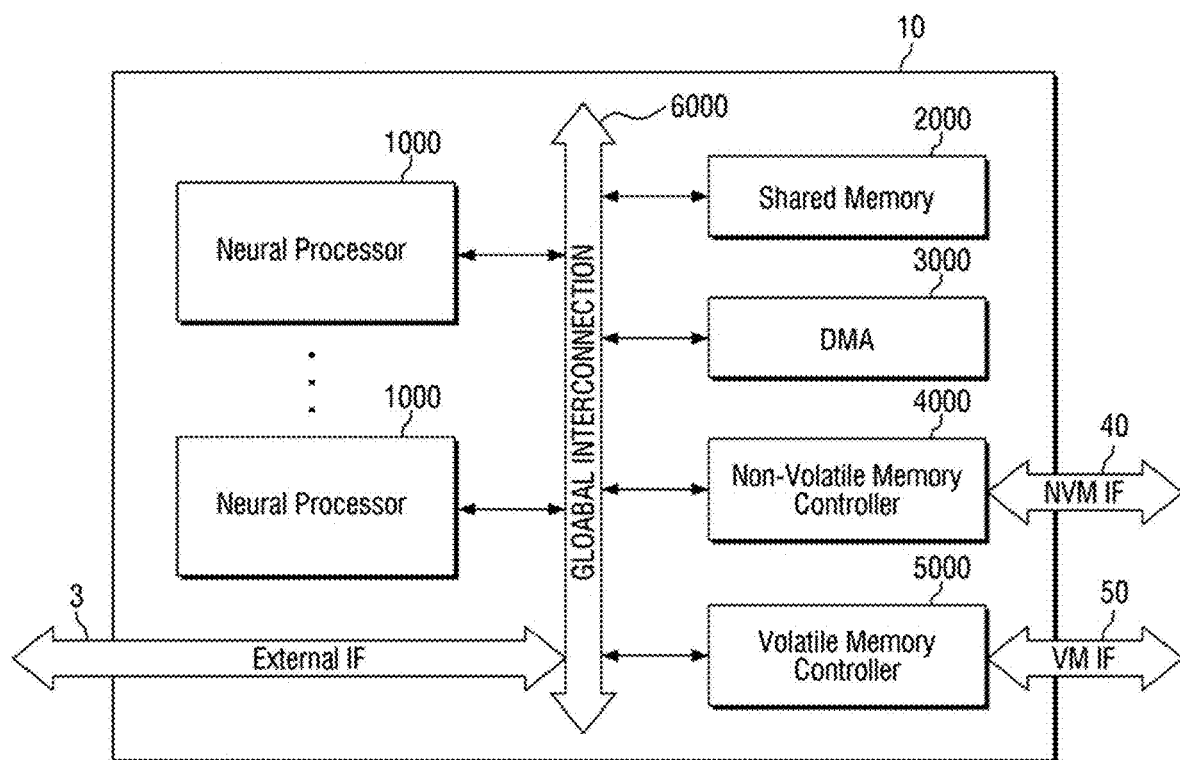
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist a plurality of neural processors 1000, calculation tasks may be assigned to neural processors 1000. The neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store the data temporarily, and transfer the data to each neural processor 1000. The shared memory 2000 may also receive data from the neural processor 1000, store the data temporarily, and transfer the data to the off-chip memory 30 of FIG. 2.

The shared memory 2000 may be required to be a relatively high-speed memory. Accordingly, the shared memory 2000 may include, for example, an SRAM. However, the embodiment is not limited thereto. In some embodiments, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40. In some embodiments, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The volatile memory controller 5000 may control the task of reading from or writing onto the volatile memory 32. Further, the volatile memory controller 5000 may perform a refresh task of the volatile memory 32. The volatile memory controller 5000 may control the volatile memory 32 via the first volatile memory interface 50. Likewise, the volatile memory controller 5000 may be referred to as a volatile memory controller circuit, but for the sake of convenience, the terms are unified as a volatile memory controller. In addition, the volatile memory controller 5000 may be implemented as a circuit or circuitry.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. In some embodiments, in the neural processing device, each neural processor 1000 may directly transmit and receive a synchronization signal, instead of a separate control processor managing the synchronization signal. Accordingly, it is possible to preclude the latency of the synchronization signal generated by the control processor.

In some embodiments, if there exist a plurality of neural processors 1000, there may be dependencies of individual tasks in which the task of one neural processor 1000 needs to be finished before the next neural processor 1000 can start a new task. The end and start of these individual tasks can be checked and/or coordinated via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task can increase exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In some embodiments, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may increase significantly as the number of neural processors 1000 increases. Accordingly, in the neural processing device, in accordance with some embodiments, the scheduling task is also performed by the individual neural processors 1000, and thus, the performance of the neural processing device can be improved without resulting in an additional scheduling burden.

Figure 4:
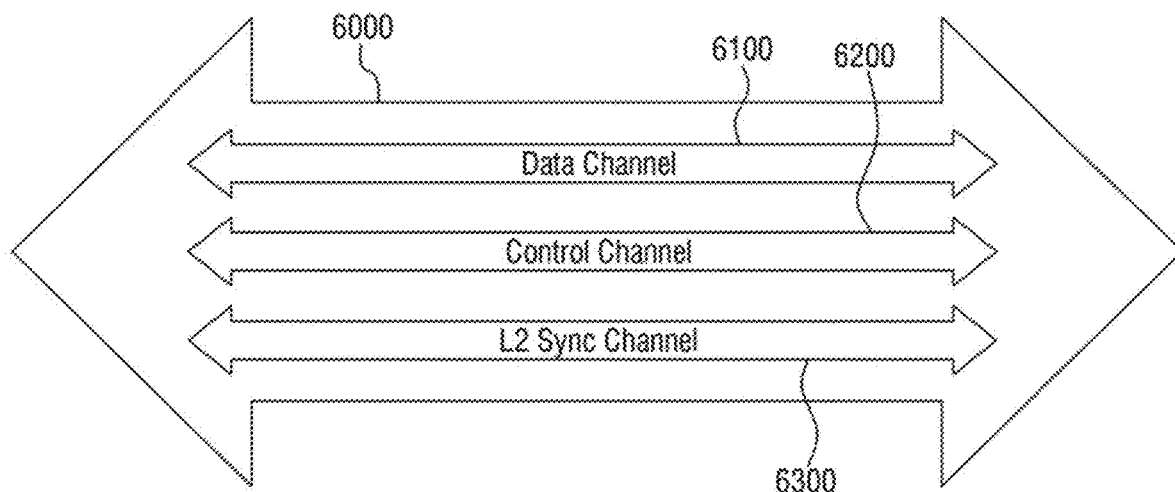
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
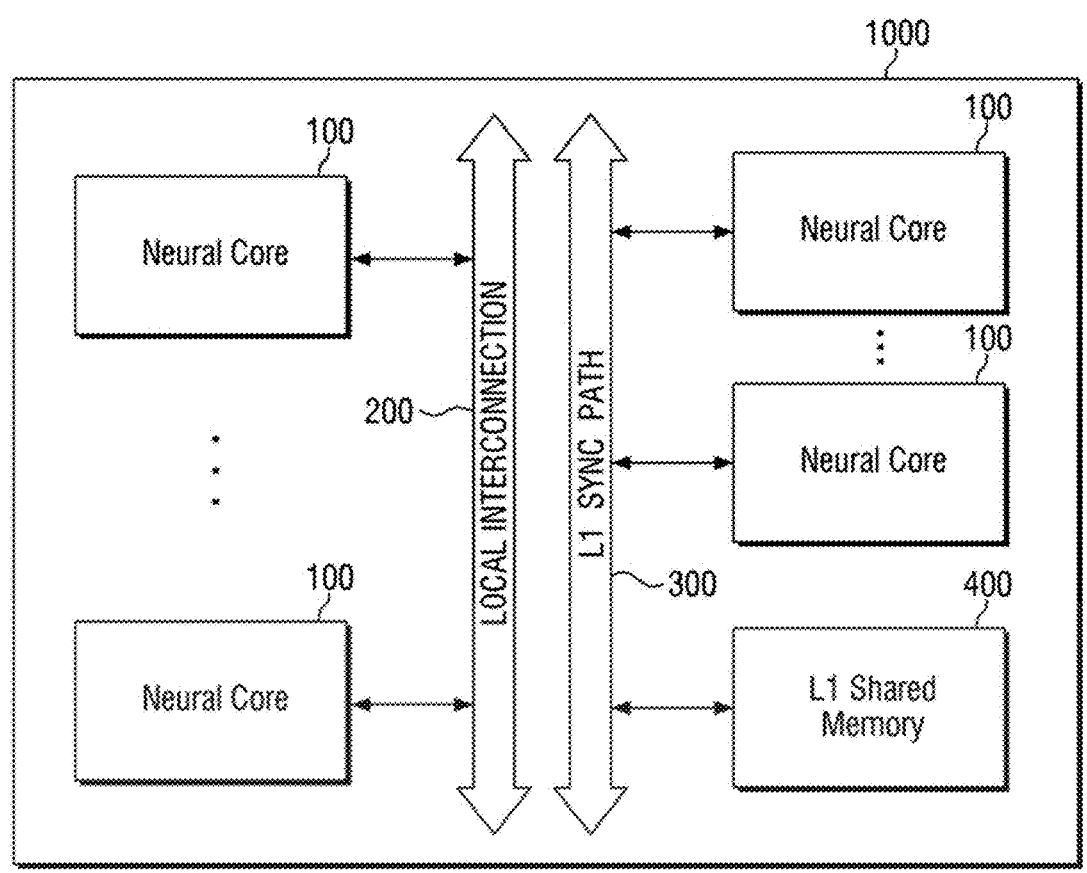
FIG. 5 is a block diagram for illustrating the neural processor of FIG. 3.

FIG. 5 is a block diagram for illustrating the neural processor of FIG. 3.

Referring to FIGS. 3 to 5, the neural processor 1000 may include at least one neural core 100, an L1 shared memory 400, a local interconnection 200, and an L1 sync path 300.

The at least one neural core 100 may share and perform the tasks of the neural processor 1000. The number of neural cores 100 may be, for example, eight. However, the embodiment is not limited thereto. FIGS. 3 and 5 illustrate that a plurality of neural cores are included in the neural processor 1000, but the embodiment is not limited thereto. In some embodiments, the neural processor 1000 may be configured with only one neural core.

The L1 shared memory 400 may be a memory shared by the neural cores 100 in the neural processor 1000. The L1 shared memory 400 may store data of each neural core 100. In addition, the L1 shared memory 400 may receive data from the shared memory 2000 of FIG. 3, store them temporarily, and transfer them to each neural core 100. On the contrary, the L1 shared memory 400 may also receive data from the neural core 100, store them temporarily, and transfer them to the shared memory 2000 of FIG. 3.

The L1 shared memory 400 may be a memory corresponding to the neural processor level, i.e., level 1 (L1). The L2 shared memory, i.e., the shared memory 2000 may be shared by the neural processors 1000, and the L1 shared memory 400 may be shared by the neural cores 100.

The local interconnection 200 may connect the at least one neural core 100 and the L1 shared memory 400 to each other. The local interconnection 200 may be a path through which data travels between the at least one neural core 100 and the L1 shared memory 400. The local interconnection 200 may be connected and transmit data to the global interconnection 6000 of FIG. 3.

The L1 sync path 300 may connect the at least one neural core 100 and the L1 shared memory 400 to each other. The L1 sync path 300 may be a path through which synchronization signals of the at least one neural core 100 and the L1 shared memory 400 travel.

The L1 sync path 300 may be formed physically separately from the local interconnection 200. In the case of the local interconnection 200, sufficient channels may not be formed therein, unlike the global interconnection 6000. In such a case, the L1 sync path 300 may be formed separately so that the synchronization signal can be transmitted quickly and without any delay. The L1 sync path 300 may be used for synchronization performed at a level one step lower than that of the L2 sync channel 6300 of the global interconnection 6000.

Figure 6:
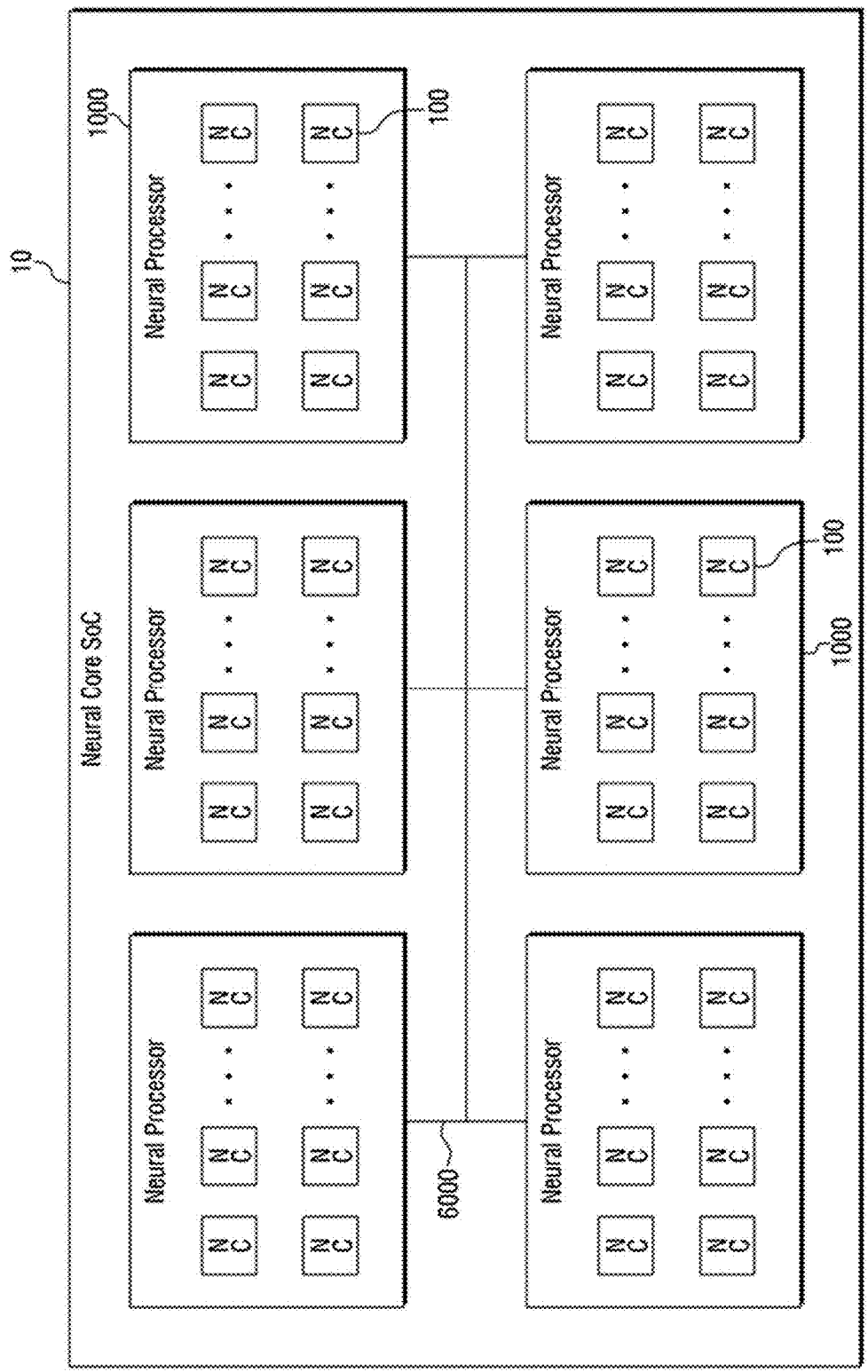
FIG. 6 is a diagram for illustrating a hierarchical structure of a neural processing device in accordance with some embodiments of the disclosure.

FIG. 6 is a diagram for illustrating a hierarchical structure of a neural processing device in accordance with some embodiments of the disclosure.

Referring to FIG. 6, the neural core SoC 10 may include at least one neural processor 1000. The neural processors 1000 may transmit data to each other via the global interconnection 6000.

Each of the neural processors 1000 may include at least one neural core 100. The neural core 100 may be a processing unit optimized for deep learning calculation tasks. The neural core 100 may be a processing unit corresponding to one operation of a deep learning calculation task. In some embodiments, a deep learning calculation task can be represented by a sequential or parallel combination of multiple operations. Each of the neural cores 100 may be a processing unit capable of processing one operation, and may be a minimum calculation unit that can be considered for scheduling from the viewpoint of a compiler.

The neural processing device in accordance with the embodiment may configure the scales of the minimum calculation unit considered from the viewpoint of compiler scheduling and the hardware processing unit to be the same, so that fast and efficient scheduling and calculation tasks can be performed.

In some embodiments, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware processing unit to be similar in the embodiment, it is possible to simultaneously satisfy the fast scheduling of calculation tasks and the efficient execution of the calculation tasks without wasting hardware resources.

Figure 7:
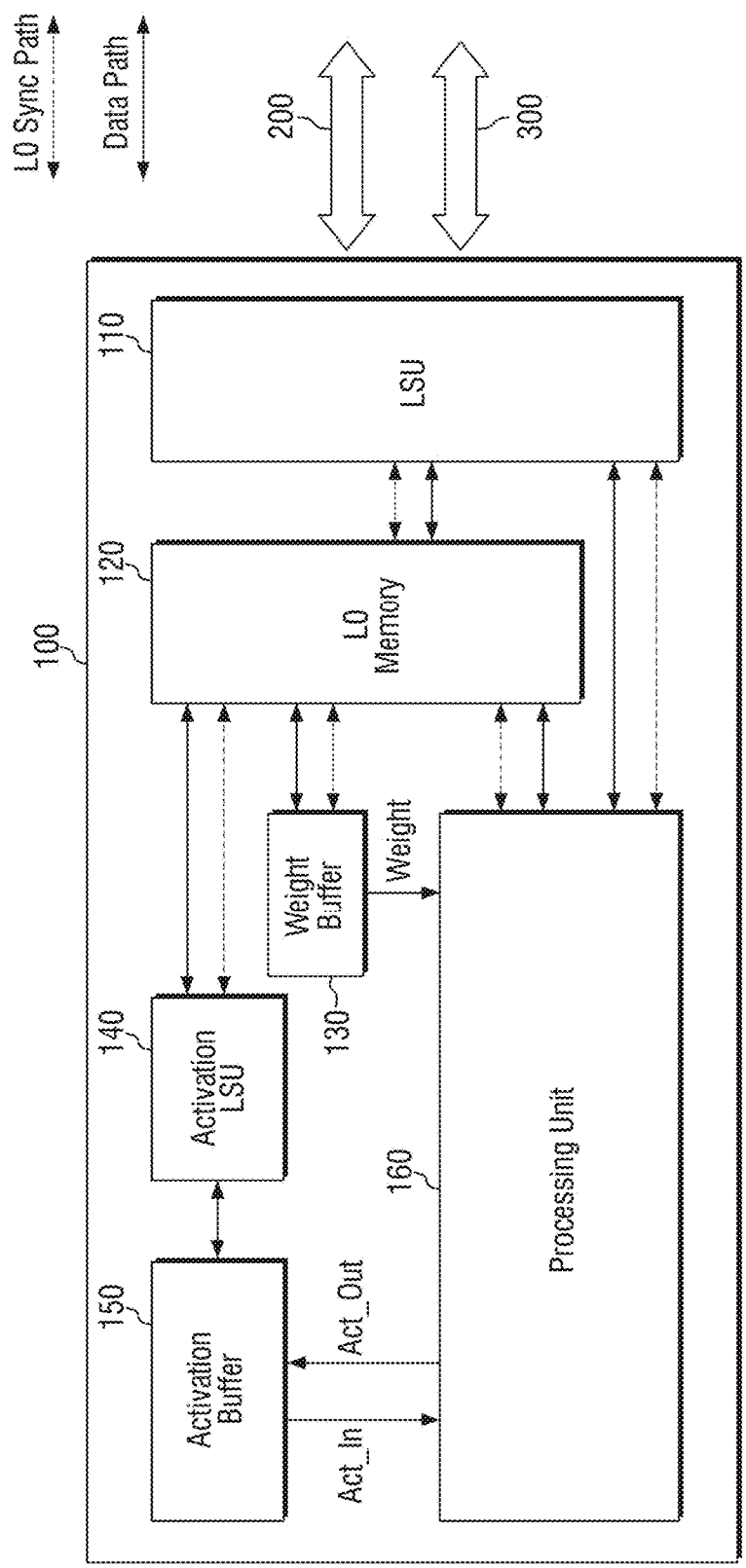
FIG. 7 is a block diagram for illustrating the neural core of FIG. 5 in detail.

FIG. 7 is a block diagram for illustrating the neural core of FIG. 5 in detail.

Referring to FIG. 7, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 200 and the L1 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L1 sync path 300. In some embodiments, the LSU 110 may be referred to as an LSU circuit, but for the sake of convenience, the terms are unified as an LSU. In addition, the LSU 110 may be implemented as a circuit or circuitry.

Figure 8:
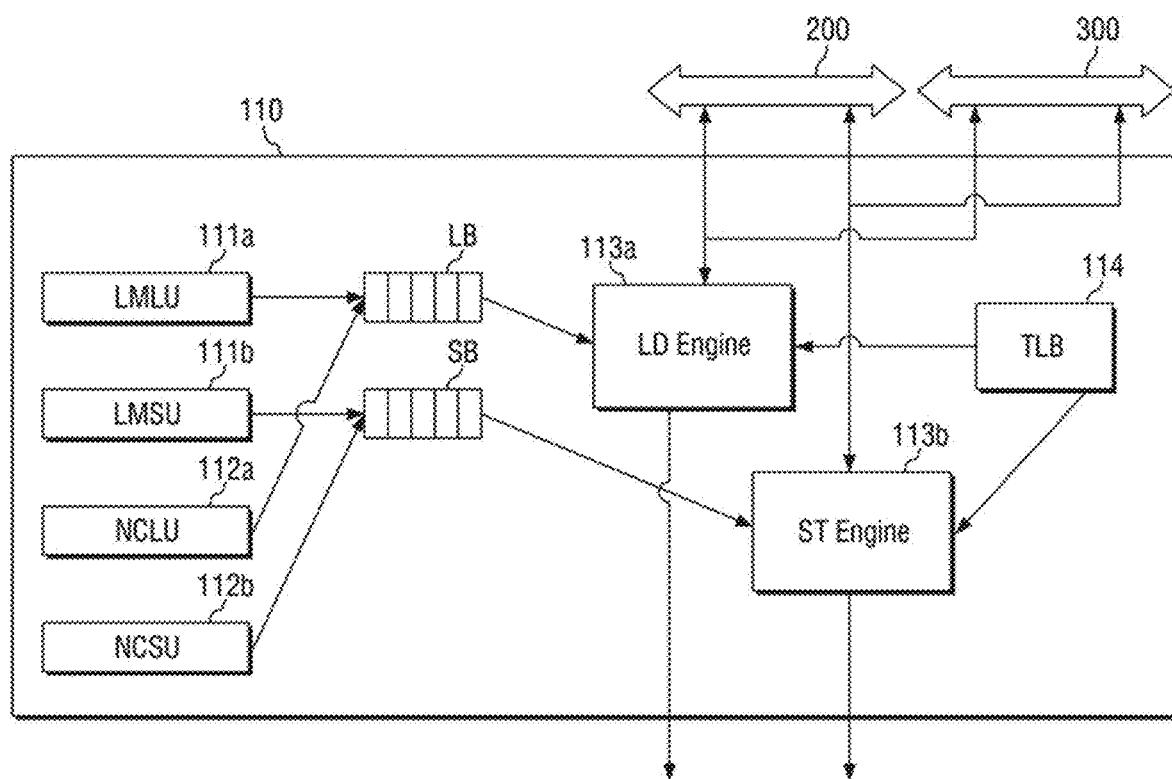
FIG. 8 is a block diagram for illustrating the LSU of FIG. 7 in detail.

FIG. 8 is a block diagram for illustrating the LSU of FIG. 7 in detail.

Referring to FIG. 8, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a, the local memory store unit 111b, the neural core load unit 112a, the neural core store unit 112b, the load engine 113a, and the store engine 113b may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, each of the local memory load unit 111a, the local memory store unit 111b, the neural core load unit 112a, the neural core store unit 112b, the load engine 113a, and the store engine 113b may be implemented as a circuit or circuitry.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. In some embodiments, the load engine 113a may quickly find the data by using a translation table of a logical address and a physical address that has been used recently in the translation lookaside buffer 114. If the logical address of the load engine 113a is not in the translation lookaside buffer 114, the address translation information may be found in another memory.

The store engine 113b may receive the memory access request and retrieve data via the local interconnection 200. In some embodiments, the store engine 113b may quickly find the data by using a translation table of a logical address and a physical address that has been used recently in the translation lookaside buffer 114. If the logical address of the store engine 113b is not in the translation lookaside buffer 114, the address translation information may be found in another memory.

The load engine 113a and the store engine 113b may send synchronization signals to the L1 sync path 300. In some embodiments, the synchronization signal may indicate that the task has been completed.

Referring to FIG. 7 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In some embodiments, the L0 memory 120 may exchange data with each of a processing element (PE) array 163 and a vector unit 164. The L0 memory 120 may be a memory corresponding to the level of the neural core. In some embodiments, the L0 memory 120 may be a private memory of the neural core that is not shared.

The L0 memory 120 may be a memory corresponding to the level of the neural core. In some embodiments, the L0 memory 120 may be a private memory of the neural core.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network. In some embodiments, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In some embodiments, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 9:
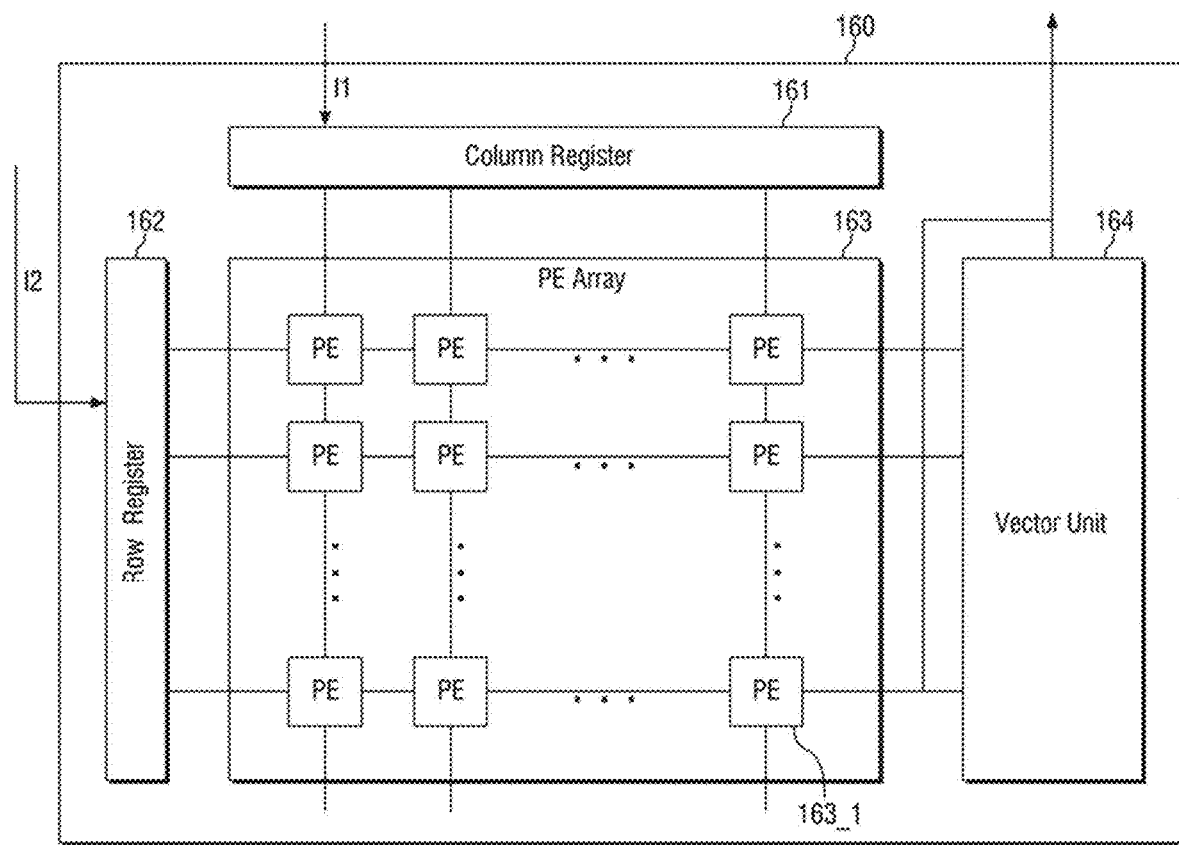
FIG. 9 is a block diagram for illustrating the processing unit of FIG. 7.

FIG. 9 is a block diagram for illustrating the processing unit of FIG. 7 in detail.

Referring to FIG. 7 and FIG. 9, the processing unit 160 may include a PE array 163, a vector unit 164, a column register 161, and a row register 162.

The PE array 163 may receive the input activation Act_In and the weight and perform multiplication on them. In some embodiments, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element (PE) 163_1. The processing elements 163_1 may be aligned with each other so that each of the processing elements 163_1 may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In some embodiments, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements 163_1.

The row register 162 may receive a second input I2. The row register 162 may receive the second input I2, and distribute them to each row of the processing elements 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 10:
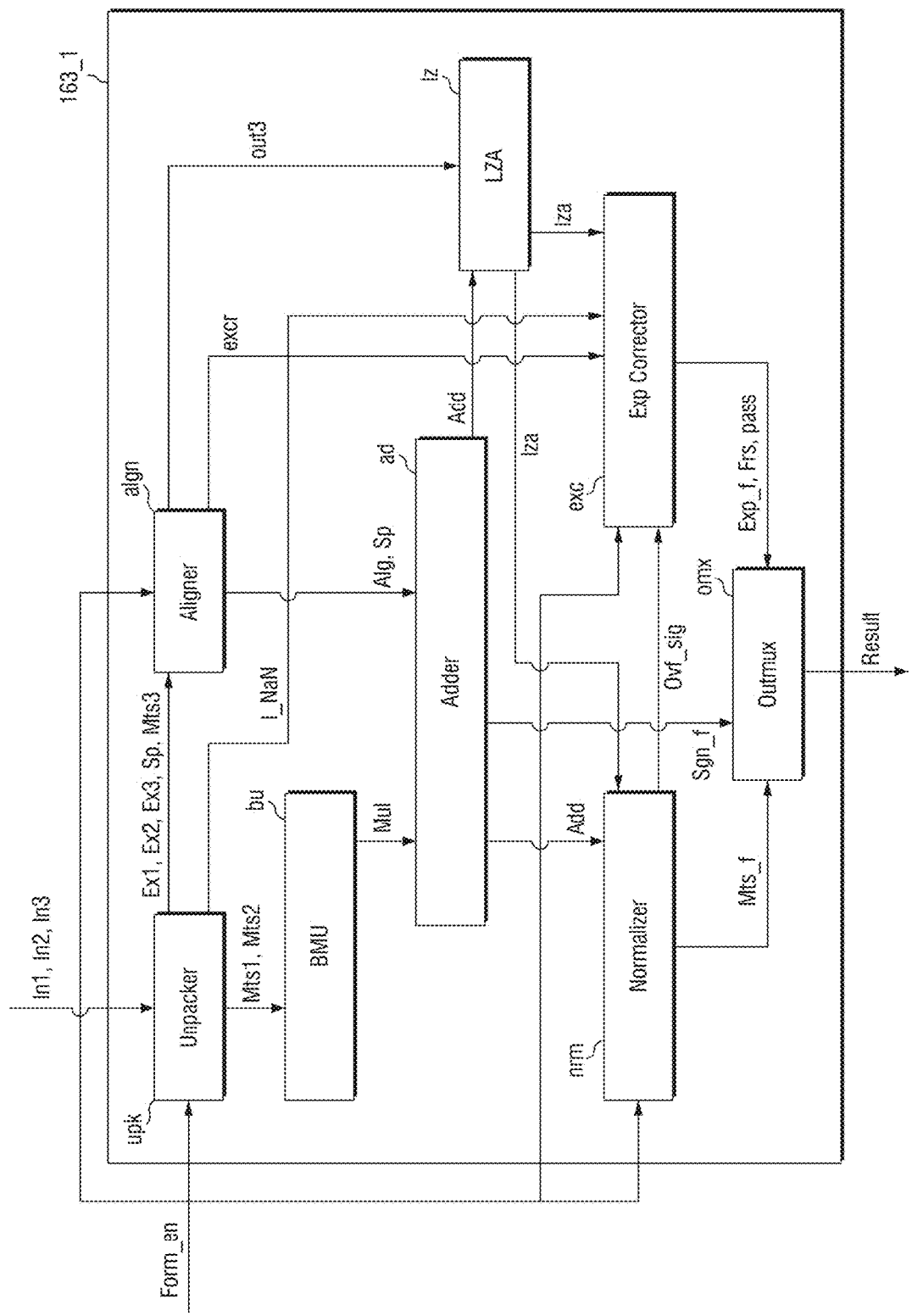
FIG. 10 is a block diagram for illustrating the processing element of FIG. 9 in detail.

FIG. 10 is a block diagram for illustrating the processing element of FIG. 9 in detail.

Referring to FIG. 10, the processing element 163_1 may include an unpacker upk, an aligner algn, a bit manipulation unit (BMU) bu, an adder ad, a leading zero anticipator (LZA) lz, a normalizer nrm, an exponent (Exp) corrector exc, and an output mux omx. The processing element 163_1 may be an operator capable of performing floating-point operations. Floating-point operations can perform exponent sorting, addition, normalization, and rounding.

The unpacker upk, the aligner algn, the bit manipulation unit bu, the adder ad, the leading zero anticipator lz, the normalizer nrm, the exponent corrector exc, and the output mux (Outmux) omx may be referred to as an unpacker circuit, an aligner circuit, a bit manipulation circuit, an adder circuit, a leading zero anticipator circuit, a normalizer circuit, an exponent corrector circuit, and an output mux circuit, respectively. However, for the sake of convenience, the terms are respectively unified as an unpacker, an aligner, a bit manipulation unit, an adder, a leading zero anticipator, a normalizer, an exponent corrector, and an output mux. In addition, each of the unpacker upk, the aligner algn, the bit manipulation unit bu, the adder ad, the leading zero anticipator lz, the normalizer nrm, the exponent corrector exc, and the output mux omx may be implemented as a circuit or circuitry.

The unpacker upk may receive a format conversion signal Form_en. The format conversion signal Form_en may be referred to as a format indication signal. In some embodiments, the unpacker upk may perform unpacking in a first format before receiving the format conversion signal Form_en. When the unpacker upk receives the format conversion signal Form_en, the unpacker upk may perform unpacking in a second format. In some embodiments, the format conversion signal Form_en may indicate a format of an input or inputs of the processing element between the first format and the second format. The unpacker upk may perform unpacking in the first format when the format conversion signal Form_en indicates the first format. The unpacker upk may perform unpacking in the second format when the format conversion signal Form_en indicates the second format.

The unpacker upk may receive a first input In1, a second input In2, and a third input In3. In some embodiments, the first to third inputs In1 to In3 may be three operands in which the first input In1 and the second input In2 may be multiplied with each other, and the third input In3 may be added thereto. In some embodiments, the first input In1, the second input In2, and the third input In3 may be in the first format. The unpacker upk may extract a first mantissa Mts1 and a first exponent Ex1 from the first input In1. Further, the unpacker upk may extract a second mantissa Mts2 and a second exponent Ex2 from the second input In2. Moreover, the unpacker upk may extract a third mantissa Mts3 and a third exponent Ex3 from the third input In3. In some embodiments, the unpacker upk may extract the mantissa and exponent based on the first format or the second format according to the format conversion signal Form_en. Since the first format and the second format are different from each other in terms of the number of bits of the exponent and the number of bits of the mantissa, extraction results may be completely different depending on which format is used for extraction.

In addition, the unpacker upk may generate a sign difference signal Sp via the signs of the first input In1, the second input In2. However, the embodiment is not limited thereto.

The unpacker upk may transfer the first mantissa Mts1 and the second mantissa Mts2 to the bit manipulation unit bu. The unpacker upk may transmit the first exponent Ex1, the second exponent Ex2, the third exponent Ex3, and the sign difference signal Sp to the aligner algn. In some embodiments, the unpacker upk may also transfer the third mantissa Mts3 to the aligner algn.

The unpacker upk may also generate not-a-number (NaN) information I_NaN if at least one of the first input In1, the second input In2, or the third input In3 is a not-a-number. The unpacker upk may transmit the NaN information I_NaN to the exponent corrector exc.

Figure 11:
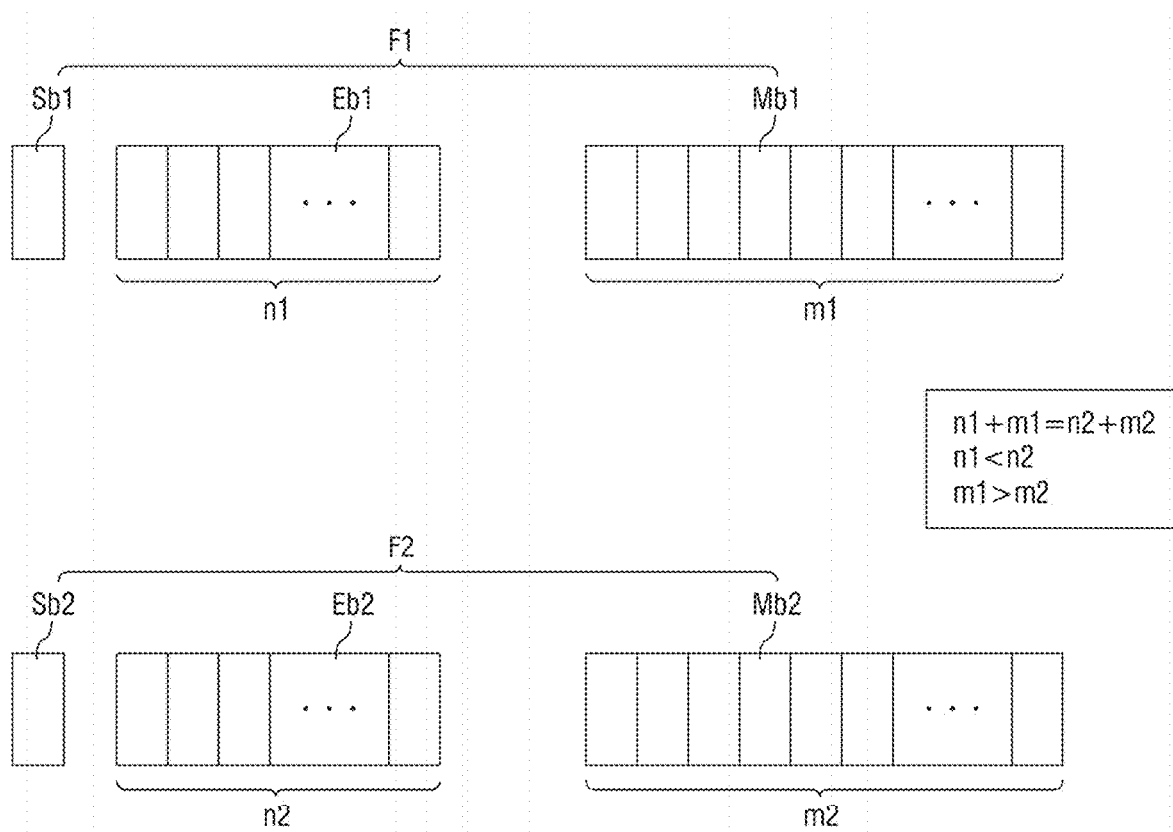
FIG. 11 is a conceptual diagram for illustrating a first format and a second format.

FIG. 11 is a conceptual diagram for illustrating a first format and a second format.

Referring to FIG. 11, an input in the first format F1 may include a first sign bit Sb1, a first exponent bit Eb1, and a first mantissa bit Mb1. The first exponent bit Eb1 may have n1 bits. The first mantissa bit Mb1 may have m1 bits.

The second format F2 may be a format different from the first format F1. An input in the second format F2 may include a second sign bit Sb2, a second exponent bit Eb2, and a second mantissa bit Mb2. The second exponent bit Eb2 may have n2 bits. The second mantissa bit Mb2 may have m2 bits.

In some embodiments, the first format F1 may have the same number of bits as the second format F2. The first sign bit Sb1 and the second sign bit Sb2 may have the same number of bits. For example, both the first sign bit Sb1 and the second sign bit Sb2 may have 1 bit.

Accordingly, the number of bits of the first exponent bit Eb1 and the number of bits of the second exponent bit Eb2 may be different from each other, and the number of bits of the first mantissa bit Mb1 and the number of bits of the second mantissa bit Mb2 may also be different from each other. However, a sum of the number of bits of the first exponent bit Eb1 and the number of bits of the first mantissa bit Mb1 and a sum of the number of bits of the second exponent bit Eb2 and the number of bits of the second mantissa bit Mb2 may also be equal to each other.

In some embodiments, it may be n1+m1=n2+m2. Accordingly, n1+m1+1, a total number of bits of the first format F1, may be equal to n2+m2+1, a total number of bits of the second format F2. The number of bits of the first exponent bit Eb1, i.e., n1, may be smaller than the number of bits of the second exponent bit Eb2, i.e., n2. Accordingly, naturally, the number of bits of the first mantissa bit Mb1, i.e., m1, may be greater than the number of bits of the second mantissa bit Mb2, i.e., m2.

In some embodiments, the first format F1 and the second format F2 may be formats having different characteristics that increase the precision of the mantissa part or increase the range of the exponent part. The first format F1 and the second format F2 may have, for example, 32 bits of single precision or 16 bits of half precision. However, the embodiment is not limited thereto.

If the first format F1 and the second format F2 are half-precision, they may be at least one of IEEE half-precision 16-bit float, bfloat16, or DLfloat. However, the embodiment is not limited thereto, and a custom format may also be applicable. For example, a custom format can adjust the number of sign bits, the number of exponent bits, and the number of mantissa bits within 16 bits as needed.

In some embodiments, the first format F1 may be, for example, DLfloat. The first format F1 may include the first sign bit Sb1 of 1 bit, the first exponent bit Eb1 of 6 bits, and the first mantissa bit Mb1 of 9 bits. The second format F2 may be, for example, Bfloat. The second format F2 may include the second sign bit Sb2 of 1 bit, the second exponent bit Eb2 of 8 bits, and the second mantissa bit Mb2 of 7 bits.

In some embodiments, before the unpacker upk receives the format conversion signal Form_en, the first mantissa bit Mb1 may be separated from the first format F1 as it is, and when the format conversion signal Form_en is received, the second mantissa bit Mb2 reduced by 2 bits may be separated.

Conversely, before the unpacker upk receives the format conversion signal Form_en, the first exponent bit Eb1 added by 2 bits may be separated from the first format F1, and when the format conversion signal Form_en is received, the second exponent bit Eb2 may be separated as it is.

The first and second formats may be applied with formats of various bits in addition to the particular bits of the number of bits described by way of example, which may be various formats that are standardized or selected through research.

Further, the first and second formats may be custom formats selected based on various criteria.

Here, the various criteria may include hardware structures, software processing schemes, and the like.

Figure 12A:
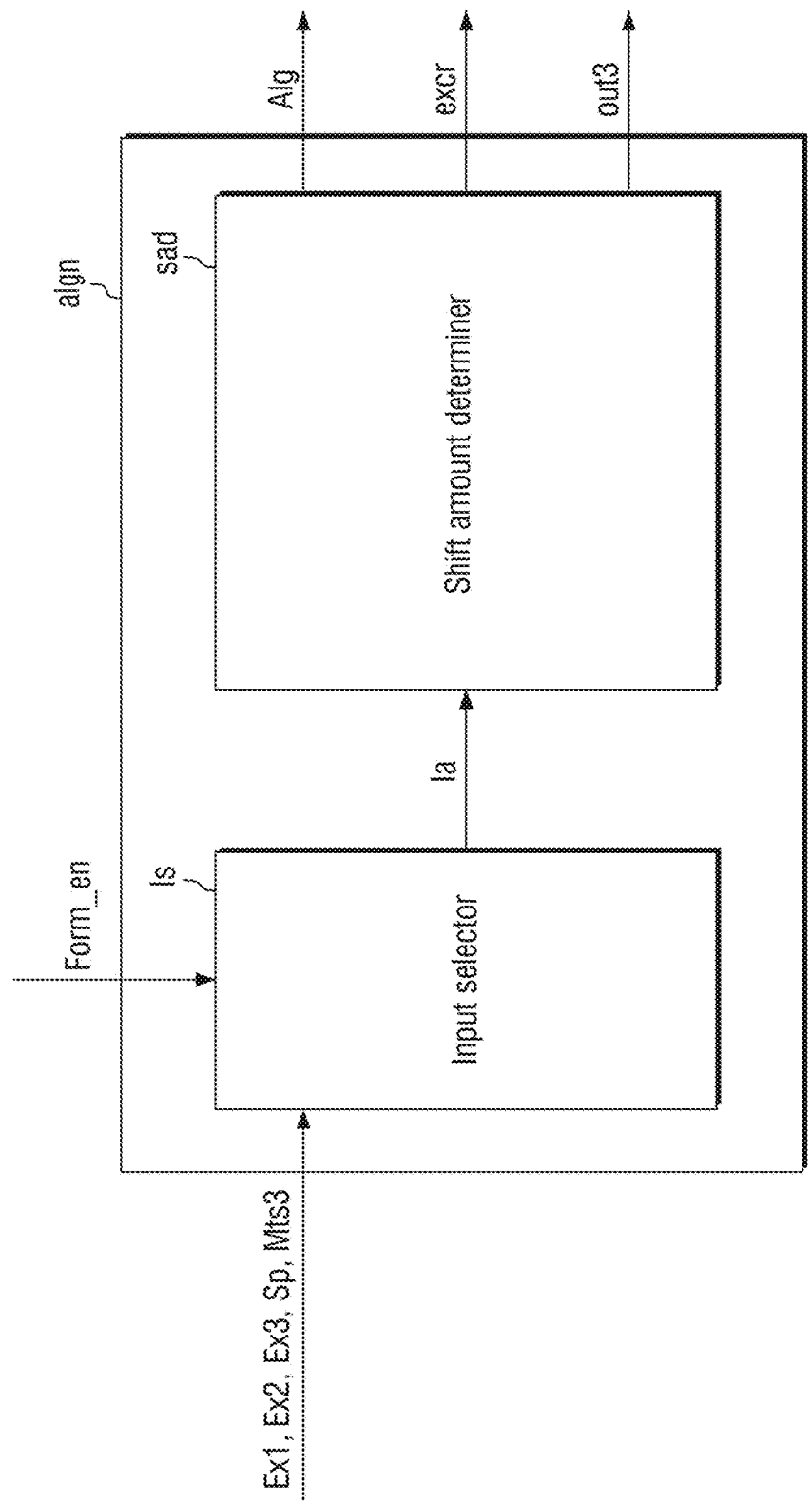
FIG. 12A is a block diagram for illustrating the aligner of FIG. 10 in detail.

FIG. 12A is a block diagram for illustrating the aligner of FIG. 10 in detail.

Referring to FIGS. 10, 11, and 12A, the aligner algn may receive the format conversion signal Form_en. The aligner algn may perform an operation in the first format F1 before receiving the format conversion signal Form_en. When the aligner algn receives the format conversion signal Form_en, the aligner algn may perform an operation in the second format F2.

The aligner algn may generate alignment information Alg and an initial exponent value excr via the first exponent Ex1, the second exponent Ex2, the third exponent Ex3, and the sign difference signal Sp. In some embodiments, the alignment information Alg may be information about how much the third input In3 should be shifted and added in the first format F1 or the second format F2. The alignment information Alg may further include the third input In3. The initial exponent value excr may be corrected and shifted maximally in the exponent corrector exc in order to determine a final exponent value Exp_f later.

The aligner algn may include an input selector Is and a shift amount determiner sad. In some embodiments, the input selector Is and the shift amount determiner sad may be referred to respectively as an input selector circuit and a shift amount determiner circuit. However, for the sake of convenience, the terms are respectively unified as an input selector and a shift amount determiner. In addition, each of the input selector Is and the shift amount determiner sad may be implemented as a circuit or circuitry.

The input selector Is may determine adjustment information Ia according to the format conversion signal Form_en.

The adjustment information Ia may be information converted by selecting existing pieces of information about the first format F1 to suit the second format F2 via an operation at a gate level. In some embodiments, the adjustment information Ia may be generated by adjusting various coefficients and constants. In addition, the adjustment information Ia may be a value obtained by adjusting the existing first exponent Ex1, second exponent Ex2, third exponent Ex3, and sign difference signal Sp according to the converted format.

The shift amount determiner sad may generate the alignment information Alg and the initial exponent value excr via the adjustment information Ia. The shift amount determiner sad may be implemented as logic that adds a sum and a carry in the form of a carry-save adder (CSA), but the embodiment is not limited thereto.

Figure 12B:
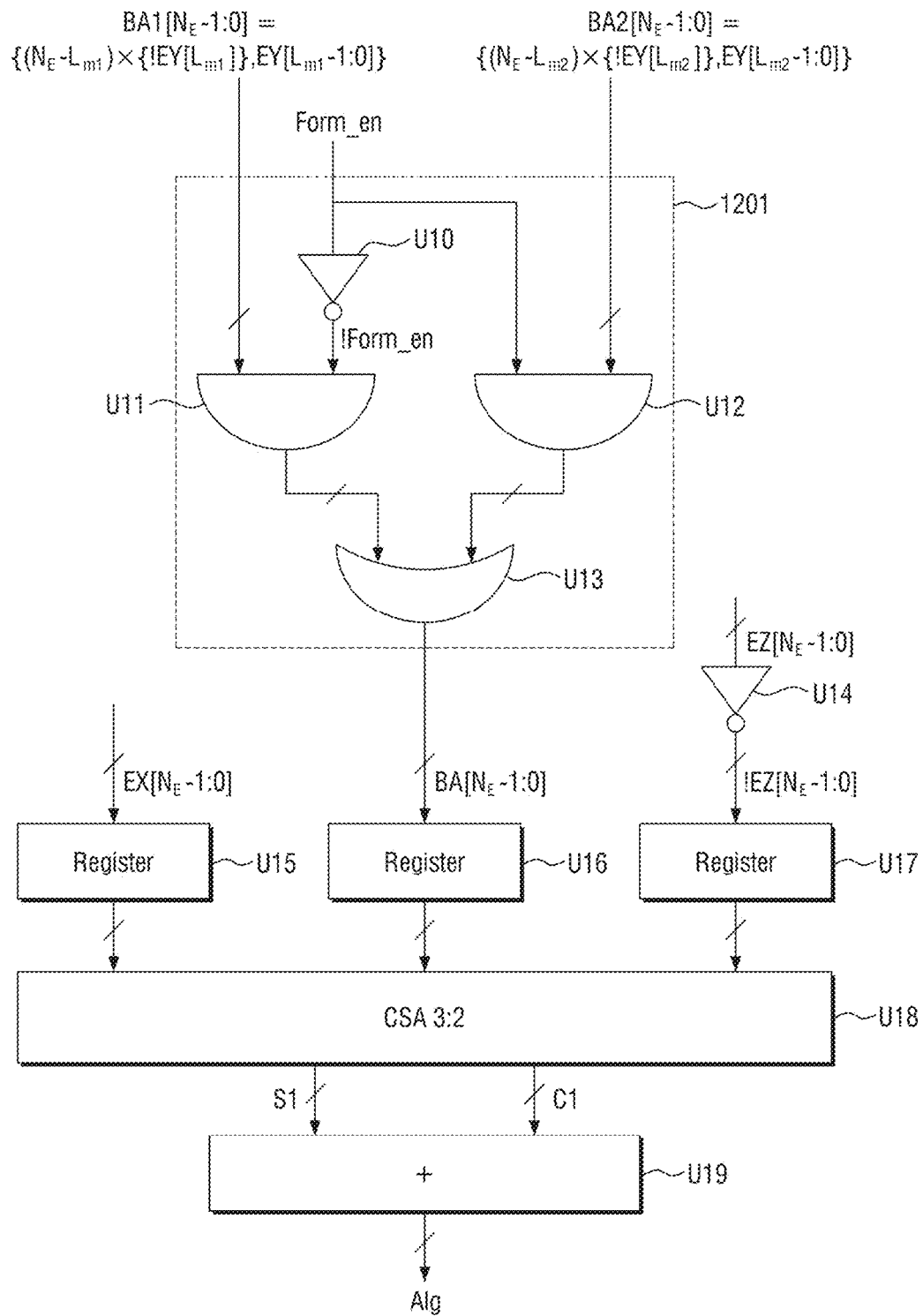
FIG. 12B is a block diagram for illustrating the shift amount determiner of FIG. 12A in detail.

FIG. 12B is a block diagram for illustrating the shift amount determiner of FIG. 12A in detail.

Referring to FIGS. 11, 12A, and 12B, the shift amount determiner sad may include an input selector 1201, a NOT gate U14, a first register U15, a second register U16, a third register U17, a first CSA U18, and an adder U19 which may be implemented as a circuit or circuitry.

Hereinafter, the first input In1, the second input In2, and the third input In3 may be referred to as a first set of bits $X[N_F-1:0]$, a second set of bits $Y[N_F-1:0]$, a third set of bits $Z[N_F-1:0]$. The $N_F$ may be a positive integer representing a total number of bits of the first floating-point number In1, the second floating-point number In2, or the third floating-point number In3. In some embodiments, the $N_F$ may be 16, 32, or 64.

As shown in FIG. 12B, if the value of the format conversion signal Form_en is low and high, it may mean, but not limited to, that the format conversion signal Form_en indicates the first format and the second format, respectively. When the format conversion signal Form_en indicates the first format, a first set of exponent bits $EX[N_E-1:0]$, a second set of exponent bits $EY[N_E-1:0]$, and a third set of exponent bits $EZ[N_E-1:0]$ are set equal to $X[L_{E1\_MBS}: L_{E1\_LSB}]$, $Y[L_{E1\_MBS}: L_{E1\_LSB}]$, $Z[L_{E1\_MBS}: L_{E1\_LSB}]$, respectively, where $L_{E\_MSB}$ is a bit location of the most significant bit of exponent bits in the first format and $L_{E\_LSB}$ is a bit location of the least significant bit of exponent bits in the first format. When the format conversion signal Form_en indicates the second format, the first set of exponent bits $EX[N_E-1:0]$, the second set of exponent bits $EY[N_E-1:0]$, and the third set of exponent bits $EZ[N_E-1:0]$ are set equal to $X[L_{E2\_MBS}: L_{E2\_LSB}]$, $Y[L_{E2\_MBS}: L_{E2\_LSB}]$, $Z[L_{E2\_MBS}: L_{E2\_LSB}]$, respectively, where $L_{E\_MSB}$ is a bit location of the most significant bit of exponent bits in the second format and $L_{E\_LSB}$ is a bit location of the least significant bit of exponent bits in the second format. For example, the location of the most significant bit of exponent bits in the IEEE 754 binary16 format, the DLFloat format, the TFP16 format, and the BFloat may be 14. The location of the least significant bit of exponent bits in the IEEE 754 binary16 format, the DLFloat format, the TFP16 format, and the BFloat may be 10, 9, 8, and 7, respectively. In some embodiments, the number $N_E$ of the first set of exponent bits $EX[N_E-1:0]$ may be equal to or greater than a maximum number of the number $N_{E1}$ ($=L_{E1\_MBS}-L_{E1\_LSB}+1$) of exponent bits in the first format and the number $N_{E2}$ ($=L_{E2\_MBS}-L_{E2\_LSB}+1$) of exponent bits in the second format. In some embodiments, the number $N_E$ may be equal to a margin number $N_{MG}$ added by the maximum number of the number $N_{E1}$ and number $N_{E1}$. In some embodiments, the $N_{MG}$ may be equal to a positive integer. In some embodiments, the $N_{MG}$ may be equal to 2. When the format conversion signal Form_en indicates the first format and the number $N_E$ of bits in each bit set of $EX[N_E-1:0]$, $EY[N_E-1:0]$, and $EZ[N_E-1:0]$ is greater than the number $N_{E1}$ of exponent bits in the first format, $(N_E-N_{E1})$ most significant bits in each bit set of $EX[N_E-1:0]$, $EY[N_E-1:0]$, and $EZ[N_E-1:0]$ are set equal to 0. When the format conversion signal Form_en indicates the second format and the number $N_E$ of bits in each bit set of $EX[N_E-1:0]$, $EY[N_E-1:0]$, and $EZ[N_E-1:0]$ is greater than the number $N_{E2}$ of exponent bits in the second format, $(N_E-N_{E2})$ most significant bits in each bit set of $EX[N_E-1:0]$, $EY[N_E-1:0]$, and $EZ[N_E-1:0]$ are set equal to 0.

The first register U15 may store the first set of exponent bits $EX[N_E-1:0]$.

The input selector 1201 may select a bit array $BA[N_E-1:0]$ between a first bit array $BA1[N_E-1:0]$ and a second bit array $BA2[N_E-1:0]$ based on the format conversion signal Form_en. In some embodiments, bits of the first bit array $BA1[N_E-1:0]$ may be set equal to the second set of exponent bits $EY[N_E-1:0]$ except that bits in the first bit array $BA1[N_E-1:0]$ from a most significant bit of the first bit array $BA1[N_E-1:0]$ to a bit corresponding to a location $L_{m1}$ of the most significant bit of exponent bits according to the first format in the second set of exponent bits $EY[N_E-1:0]$ are set equal to an inverted bit of a bit in the second set of exponent bits corresponding to the location $L_{m1}$. In some embodiments, bits of the second bit array $BA2[N_E-1:0]$ may be set equal to the second set of exponent bits $EY[N_E-1:0]$ except that bits in the second bit array $BA2[N_E-1:0]$ from a most significant bit of the second bit array $BA2[N_E-1:0]$ to a bit corresponding to a location $L_{m2}$ of the most significant bit of exponent bits according to the second format in the second set of exponent bits $EY[N_E-1:0]$ are set equal to an inverted bit of a bit in the second set of exponent bits corresponding to the location $L_{m2}$. In some embodiments, the first bit array $BA1[N_E-1:0]$ may be represented as $\{(N_E-L_{m1}+2)\times\{!EY[L_{m1}]\}, EY[L_{m1}-1:0]\}$ and the second bit array $BA2[N_E-1:0]$ may be represented as $\{(N_E-L_{m2}+2)\times\{!EY[L_{m2}]\}, EY[L_{m2}-1:0]\}$. In the representations, $N\times\{X\}$ may refer to N times repetition of the bit array X, where N is a positive integer and the bit array includes one or more bits. $\{X, Y\}$ may refer to concatenation of the bit array X and the bit array Y, where each of X and Y includes one or more bits. For example, the location of the most significant bit of exponent bits according to the IEEE 754 binary16 format, the DLFloat format, the TFP16format, and the BFloat in the second set of exponent bits $EY[N_E-1:0]$ may be 4, 5, 6, and 7, respectively.

The second register U16 may store the selected bit array $BA[N_E-1:0]$.

In some embodiments, the input selector 1201 may be implemented in various ways. For example, the input selector 1201 may be implemented as a multiplexer having the first bit array $BA1[N_E-1:0]$, the second bit array $BA2[N_E-1:0]$, and the format conversion signal Form_en as inputs and the bit array $BA[N_E-1:0]$ as output which is selected between the first bit array $BA1[N_E-1:0]$ and the second bit array $BA2[N_E-1:0]$ based on the format conversion signal Form_en. In some embodiments, the input selector 1201 may be implemented as a plurality of logic gates. As shown in FIG. 12B, the input selector 1201 may include a NOT gate U10, an AND gate U11, an AND gate U12, and an OR gate U13.

The NOT gate U10 may invert the format conversion signal Form_en to generate an inverted format conversion signal !Form_en.

The AND gate U11 may perform logical AND operation with the first bit array $BA1[N_E-1:0]$ and the inverted format conversion signal !Form_en to output a bit array $BA1'[N_E-1:0]$.

The AND gate U12 may perform logical AND operation with the second bit array $BA2[N_E-1:0]$ and the format conversion signal Form_en to output a bit array $BA2'[N_E-1:0]$.

The OR gate U13 may perform logical OR operation with the bit array $BA1'[N_E-1:0]$ and the bit array $BA2'[N_E-1:0]$ to output the bit array $BA[N_E-1:0]$.

The NOT gate U14 may invert the third set of exponent bits $EZ[N_E-1:0]$ to generate inverted exponent bits $!EZ[N_E-1:0]$. The third register U17 may store the inverted exponent bits $!EZ[N_E-1:0]$.

The CSA 3:2 U18 may add the bits in the first register U15, the bits in the second register U16, and the bits in the third register U17 to generate a sum array S1 and a carry array C1. In some embodiments, the CSA 3:2 U18 may have a bit width which is equal to, greater than, or determined by the number $N_E$.

The adder U19 may add the sum array S1 and the carry array C1 to generate alignment information Alg. In some embodiments, the adder U19 may be a carry-propagate adder.

Figure 12C:
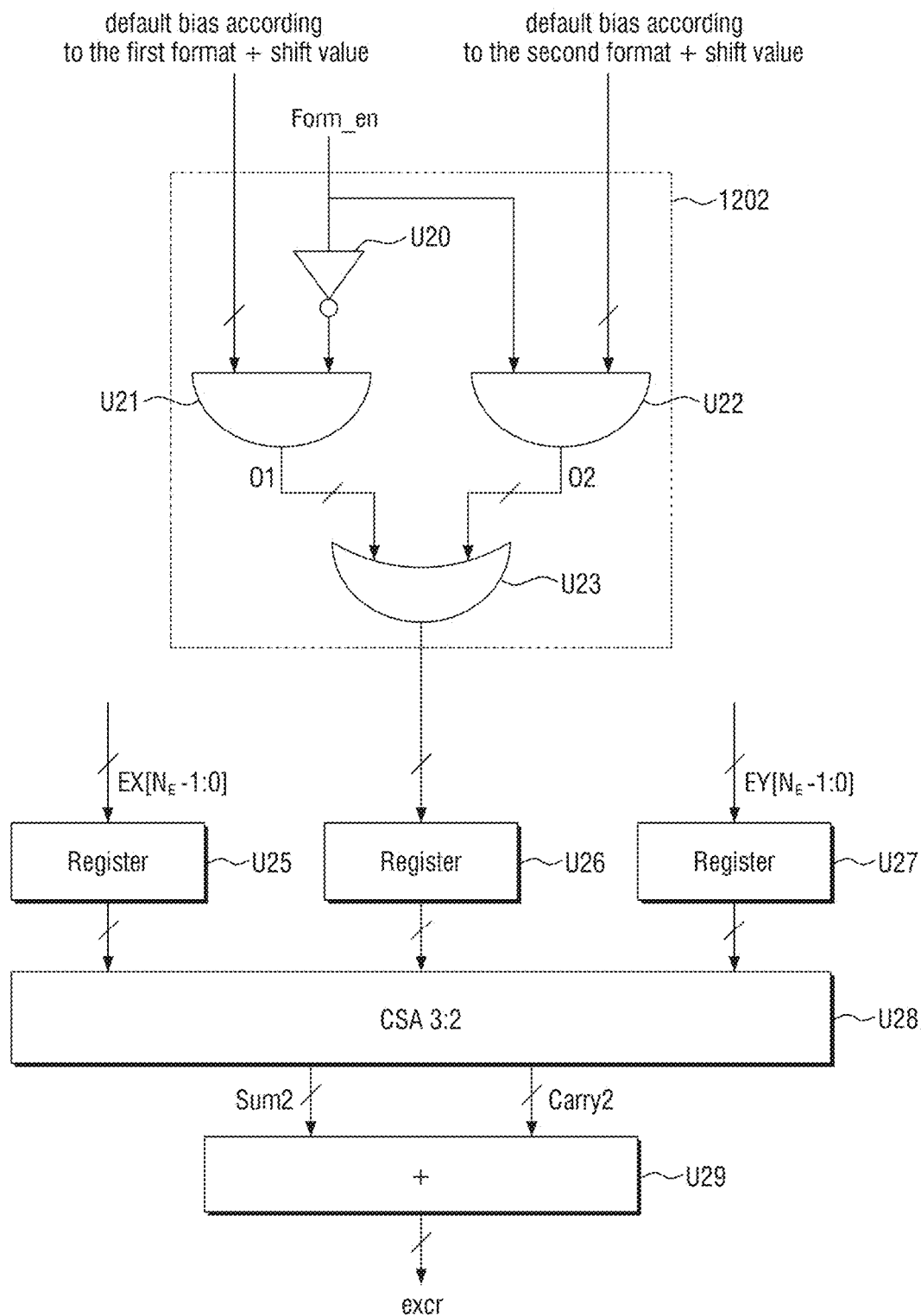
FIG. 12C is a block diagram for illustrating the shift amount determiner of FIG. 12A in detail.

FIG. 12C is a block diagram for illustrating the shift amount determiner of FIG. 12A in detail.

Referring to FIGS. 11, 12A, and 12C, the shift amount determiner sad may include an input selector 1202, a fourth register U25, a fifth register U26, a sixth register U27, a second CSA U28, and an adder U29 which may be implemented as a circuit or circuitry.

The first register U25 may store the first set of exponent bits $EX[N_E-1:0]$.

The input selector 1202 may select a bias between a first bias value and a second bias value based on the format conversion signal Form_en. In some embodiments, the first bias value is equal to a default bias value according to the first format plus an additional bias value for aligning a product of the first floating-point number and the second floating-point number and an addend corresponding to the third first floating-point number to a predefined aligning bit width. In some embodiments, the second bias value is equal to a default bias value according to the second format plus additional bias value. In some embodiments, a default bias value according to the IEEE 754 binary16 format, the DLFloat format, the TFP16 format, and the Bfloat format may be −15, −31, −63, and −127, respectively. In some embodiments, the additional bias value may be +14. In some embodiments, the bias values may be −15+14, −31+14, −63+14, and −127+14 for the IEEE 754 binary16 format, the DLFloat format, the TFP16 format, and the Bfloat format, respectively.

The second register U26 may store the selected bias.

In some embodiments, the input selector 1202 may be implemented as a plurality of logic gates. As shown in FIG. 12B, the input selector 1202 may include a NOT gate U20, an AND gate U21, an AND gate U22, and an OR gate U23.

The NOT gate U20 may invert the format conversion signal Form_en to generate an inverted format conversion signal !Form_en.

The AND gate U21 may perform logical AND operation with the first bias value and the inverted format conversion signal !Form_en to generate an output O1.

The AND gate U22 may perform logical AND operation with the second bias and the format conversion signal Form_en to generate an output O2.

The OR gate U23 may perform logical OR operation with the output O1 and the output O2 to generate the selected bias.

The third register U27 may store the second set of exponent bits $EY[N_E-1:0]$.

The CSA 3:2 U28 may add the bits in the first register U25, the bits in the second register U26, and the bits in the third register U27 to generate a sum array S2 and a carry array C2. In some embodiments, the CSA 3:2 U28 may have a bit width which is equal to, greater than, or determined by the number $N_E$.

The adder U29 may add the sum array S2 and the carry array C2 to generate initial output exponent bits $EO1[N_E-1:0]$ corresponding to the initial exponent value excr. In some embodiments, the adder U29 may be a carry-propagate adder.

The second CSA U28 may be a carry-save adder, thus generate a sum and a carry via an addition operation. The second CSA U28 may receive the adjustment information Ia and generate the initial exponent value excr. In some embodiments, the alignment information Alg may be derived via the sum and carry. The width w of the second CSA U28 may be determined, for example, by the exponent bit of the format. Specifically, the width w may be determined by the largest number of bits of exponent bit of the format. For example, the width w may be a value obtained by adding additional bits to the second exponent bit Eb2 when the number of bits of the second exponent bit Eb2 is greater than the number of the bits of the first exponent bit Eb1. In some embodiments, the width w may be fixed in accordance with exponent bits. In some embodiments, the additional bits may be, for example, 2 bits, but the embodiment is not limited thereto. The additional bits may be 1 bit or 3 bits or more.

Before the format conversion signal Form_en is received, the second CSA U28 may receive the adjustment information Ia as information corresponding to the first format F1 and derive the initial exponent value excr according to the first format F1. In some embodiments, the adjustment information Ia may include fourth information i4, fifth information i5, and sixth information i6. The fourth information i4 and the sixth information i6 may be information associated with the first exponent Ex1 and the second exponent Ex2, respectively. Further, the fifth information i5 may be a pre-calculated constant.

After the format conversion signal Form_en is received, the second CSA U28 may receive the adjustment information Ia' as information corresponding to the second format F2 and derive the initial exponent value excr according to the second format F2. In some embodiments, the adjustment information Ia' may include fourth modified information i4', fifth modified information i5', and sixth modified information i6'.

The fourth modified information i4', the fifth modified information i5', and the sixth modified information i6' may be information associated with the first exponent Ex1, the pre-calculated constant, and the second exponent Ex2, respectively. Specifically, the fourth modified information i4' and the sixth modified information i6' may be information modified by processing the fourth information i4 and the sixth information i6 with bit operations, respectively. On the other hand, the fifth modified information i5' is a pre-calculated constant and may be a value calculated via the fifth information i5 and the format conversion signal Form_en.

Referring again to FIGS. 10 and 11, the bit manipulation unit bu may receive the first mantissa Mts1 and the second mantissa Mts2 and generate a multiplied value Mul of the two mantissas. The two mantissas may be values originating from the first input In1 and the second input In2.

The adder ad may receive the multiplied value Mul, the sign difference signal Sp and the alignment information Alg. The adder ad may add the value of the third input In3 newly aligned according to the multiplied value Mul and the alignment information Alg. Accordingly, the adder ad may generate an added value add. In some embodiments, the added value add may include a sum and a carry. In some embodiments, the added value add may be a value for which a rounding task has also been performed. In addition, the added value add may include information capable of identifying a case in which all values are zero. Furthermore, a final sign value Sgn_f may be generated via the alignment information Alg and the sign difference signal Sp. The adder ad may transmit the added value add to the normalizer nrm and the leading zero anticipator lz. The adder ad may also transfer the final sign value Sgn_f to the output mux omx.

The leading zero anticipator lz may receive the added value add from the adder ad. The leading zero anticipator lz may perform shift logic later, and generate a leading zero anticipation value lza. The leading zero anticipator lz may transmit the leading zero anticipation value lza to the normalizer nrm and the exponent corrector exc.

The normalizer nrm may receive the format conversion signal Form_en. The normalizer nrm may perform an operation in the first format F1 before receiving the format conversion signal Form_en. When the normalizer nrm receives the format conversion signal Form_en, the normalizer nrm may perform an operation in the second format F2.

The normalizer nrm may perform a normalization operation. Since a configuration of the number of bits of the first format F1 and a configuration of the number of bits of the second format F2 are different from each other, the operation of the normalizer nrm according to the format conversion signal Form_en may be completely different. The normalization may be an operation of adjusting the number of mantissa bits according to the formats.

The normalizer nrm may generate a final mantissa value Mts_f via a normalization task of the added value add. In some embodiments, the leading zero anticipation value lza may be used. Further, the normalizer nrm may generate an overflow signal Ovf_sig. In some embodiments, the overflow signal Ovf_sig may be a signal enabling the normalizer nrm to determine whether an overflow has occurred in an operation.

Figures 13, 14:
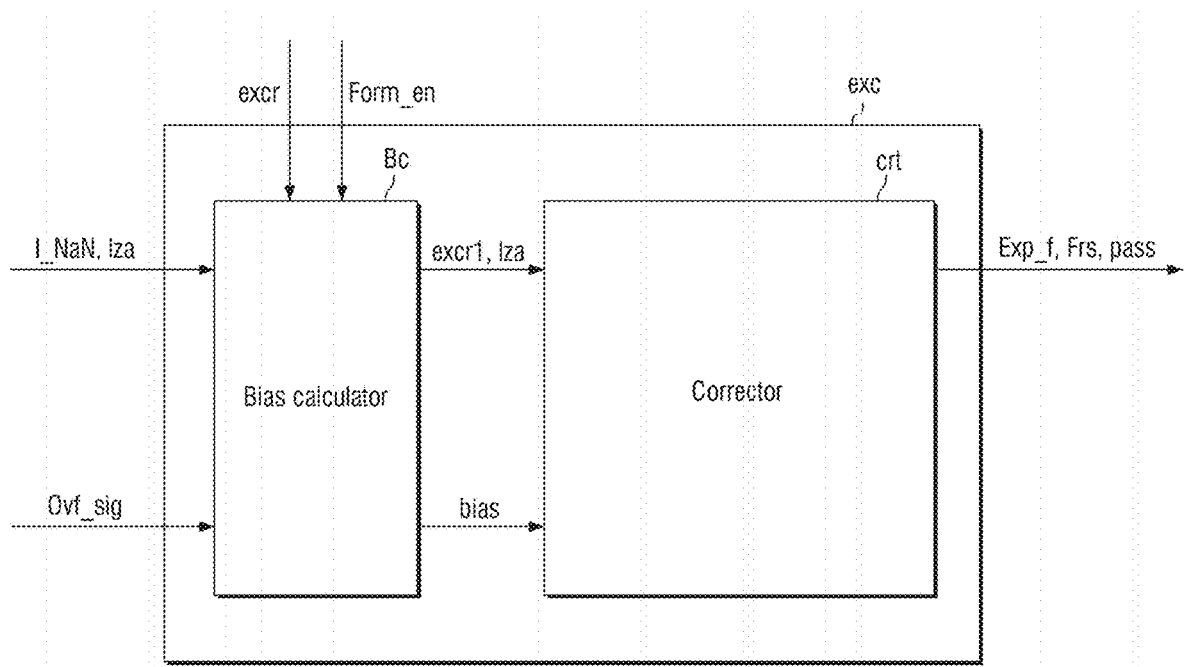
FIG. 13 is a block diagram for illustrating the exponent corrector of FIG. 10 in detail.
FIG. 14 is a table for illustrating operations for the mantissa and exponent of the output mux of FIG. 10.

FIG. 13 is a block diagram for illustrating the exponent corrector of FIG. 10 in detail.

Referring to FIGS. 10, 11, and 13, the exponent corrector exc may receive the format conversion signal Form_en. The exponent corrector exc may perform an operation in the first format F1 before receiving the format conversion signal Form_en. When the exponent corrector exc receives the format conversion signal Form_en, the exponent corrector exc may perform an operation in the second format F2.

The exponent corrector exc may receive the NaN information I_NaN, the initial exponent value excr, the overflow signal Ovf_sig, and the leading zero anticipation value lza. The exponent corrector exc may generate the final exponent value Exp_f, a mantissa specification Frs, and a pass.

In some embodiments, the final exponent value Exp_f may be the exponent part of the final result Result. The mantissa specification Frs may be a signal capable of determining whether NaN has occurred or an overflow has occurred. In some embodiments, the mantissa specification Frs may be 1 if NaN has occurred or an overflow has occurred, and the mantissa specification Frs may be 0 otherwise. However, the embodiment is not limited thereto.

The pass may be a signal capable of determining whether the mantissa is not 0 and an underflow has occurred. In some embodiments, the pass may be 1 if the mantissa is not 0 and an underflow has not occurred, and the pass may be 0 otherwise, i.e., if the mantissa is 0 or an underflow has occurred. However, the embodiment is not limited thereto.

The exponent corrector exc may include a maximum shift calculator ms and a corrector crt. In some embodiments, the maximum shift calculator ms and the corrector crt may be referred to respectively as a maximum shift calculator circuit and a corrector circuit. However, for the sake of convenience, the terms are respectively unified as a maximum shift calculator and a corrector. Further, each of the maximum shift calculator ms and the corrector crt may be implemented as a circuit or circuitry.

The maximum shift calculator ms may generate an exponent correction value excr1 by using the format conversion signal Form_en and the initial exponent value excr. The exponent correction value excr1 may be a corrected exponent value according to a currently used format out of the first format F1 and the second format F2. The maximum shift mxsht may refer to a maximum shift value generated via the format conversion signal Form_en and the leading zero anticipation value lza, i.e., a value for defining overflow and underflow.

The corrector crt may generate a final exponent, i.e., the final exponent value Exp_f via the exponent correction value excr1, the leading zero anticipation value lza and the maximum shift mxsht. The final exponent value Exp_f may be smaller than the initial exponent value final exponent value Exp_f. In addition, the mantissa specification Frs and the pass related to overflow, underflow, and NaN may be generated.

Referring again to FIGS. 10 and 11, the output mux omx may receive the final mantissa value Mts_f, the final sign value Sgn_f, and the final exponent value Exp_f. Accordingly, the output mux omx may generate the final result Result. In some embodiments, the final result Result may be a value obtained by multiplying the first input In1 and the second input In2 and adding the third input In3 to the result.

In addition, the output mux omx may receive the mantissa specification Frs and the pass. Through this, the output mux omx may determine an output if the final result Result is any of overflow, underflow, or NaN.

FIG. 14 is a table for illustrating operations for the mantissa and exponent of the output mux of FIG. 10.

Referring to FIGS. 10 and 14, if the mantissa specification Frs received by the output mux omx is 1, the final result Result excluding the sign may be an overflow or NaN value. In FIG. 14, 7FFF is shown by way of an example.

If the mantissa specification is 0 and if the pass is 1, the final result Result excluding the sign which is a combination of the final mantissa value Mts_f and the final exponent value Exp_f may be outputted via the output mux omx. In some embodiments, the final result Result was written as a rounded result Rnd-result.

If the mantissa specification is 0 and if the pass is 0, 0 may be outputted via the output mux omx as the final result Result excluding the sign. This may mean a case where the underflow has occurred or the mantissa is 0.

Figures 15, 16:
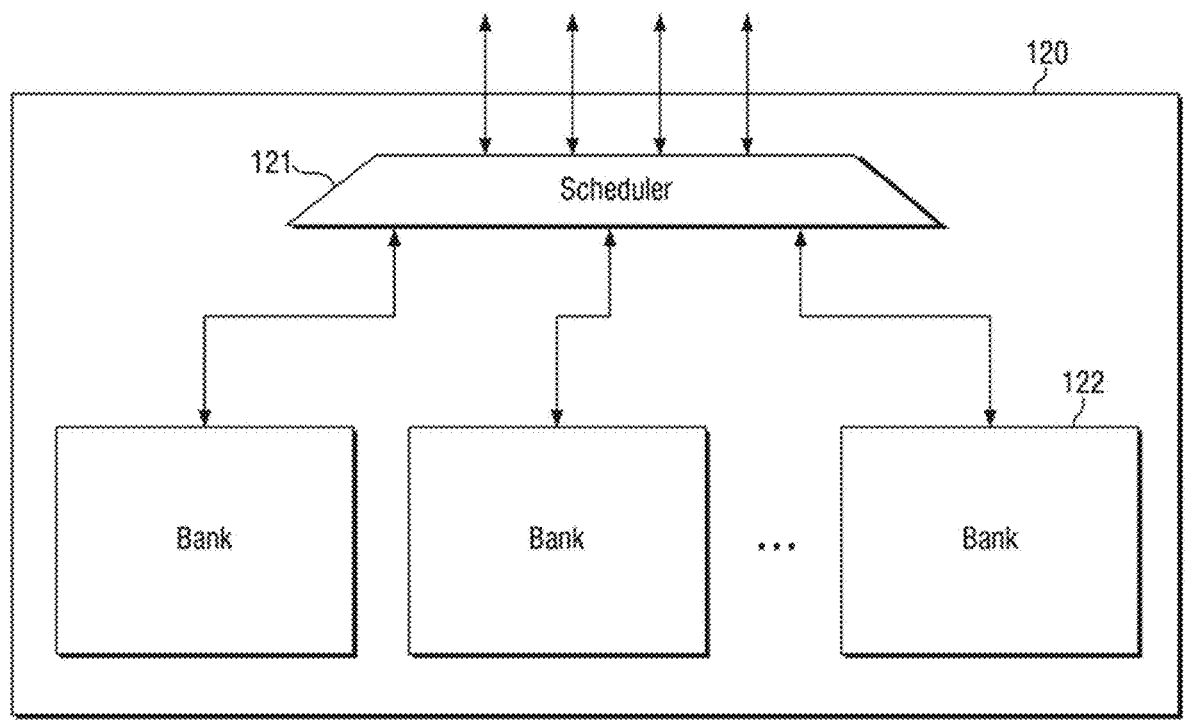
FIG. 15 is a table for illustrating operations for the sign of the output mux of FIG. 10.
FIG. 16 is a block diagram for illustrating the L0 memory of FIG. 7 in detail.

FIG. 15 is a table for illustrating operations for the sign of the output mux of FIG. 10.

Referring to FIGS. 10 and 15, if the mantissa specification Frs received by the output mux omx is 1, the sign of the final result Result may be 0 for the overflow or NaN value.

If the mantissa specification is 0 and if the pass is 1, the final sign value Sgn_f may be outputted via the output mux omx. In some embodiments, the final sign value Sgn_f was written as a rounded result Rnd-result.

If the mantissa specification is 0 and if the pass is 0, the sign of the final result Result is 1 and may be outputted via the output mux omx. This may mean a case where the underflow has occurred or the mantissa is 0.

The embodiment can enable broad support for various formats in the current situation in which a wide variety of formats are used. In some embodiments, it is possible to improve the utilization of data and the efficiency of operation by allowing other operations to be used instead of operations using only one format.

In addition, the use of these various formats can modify existing hardware without a need to newly design thereof by selecting an input by the format conversion signal or calculating the maximum shift. Accordingly, it is possible to perform the use of various formats while minimizing power consumption and maximizing the space utilization of hardware.

FIG. 16 is a block diagram for illustrating the L0 memory of FIG. 7 in detail.

Referring to FIG. 16, the L0 memory 120 may include a scheduler 121 and one or more local memory banks 122.

When data is stored in the L0 memory 120, the scheduler 121 may receive data from the load engine 113a. In some embodiments, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 200. In some embodiments, the scheduler 121 may be referred to as a scheduler circuit, but for the sake of convenience, the terms are unified as a scheduler. In addition, the scheduler 121 may be implemented as a circuit or circuitry.

Figure 17:
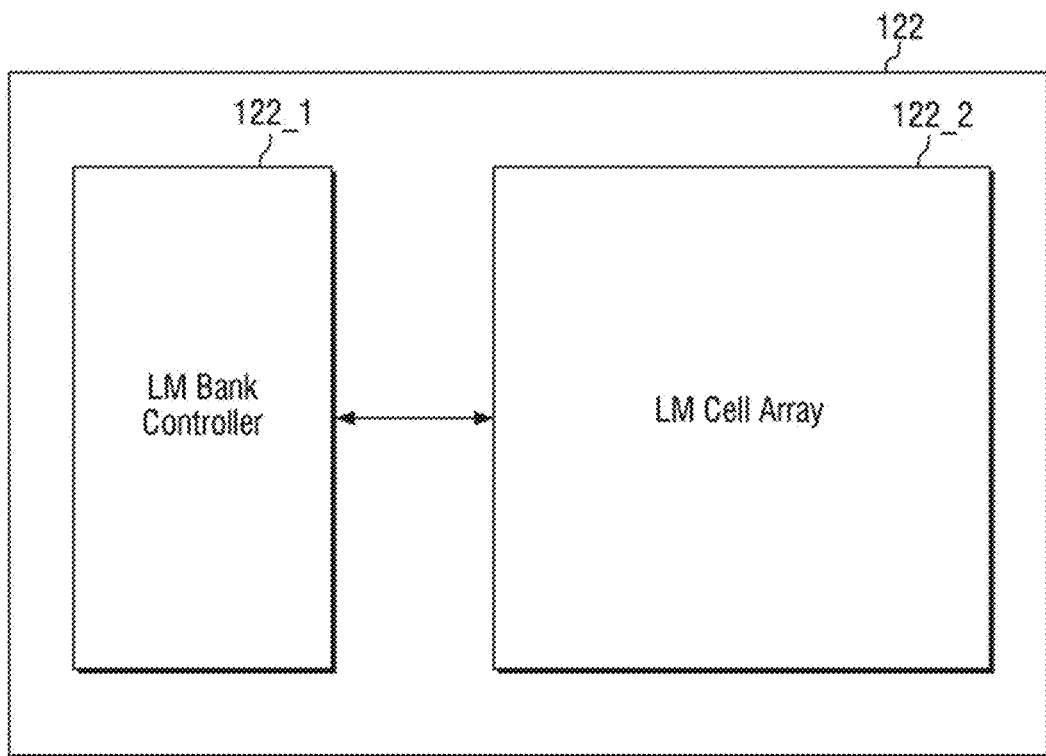
FIG. 17 is a block diagram for illustrating the local memory bank of FIG. 16.

FIG. 17 is a block diagram for illustrating the local memory bank of FIG. 16 in detail.

Referring to FIG. 17, the local memory bank 122 may include a local memory bank controller 122_1 and a local memory bank cell array 122_2.

The local memory bank controller 122_1 may manage read and write operations via the addresses of data stored in the local memory bank 122. In some embodiments, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 18:
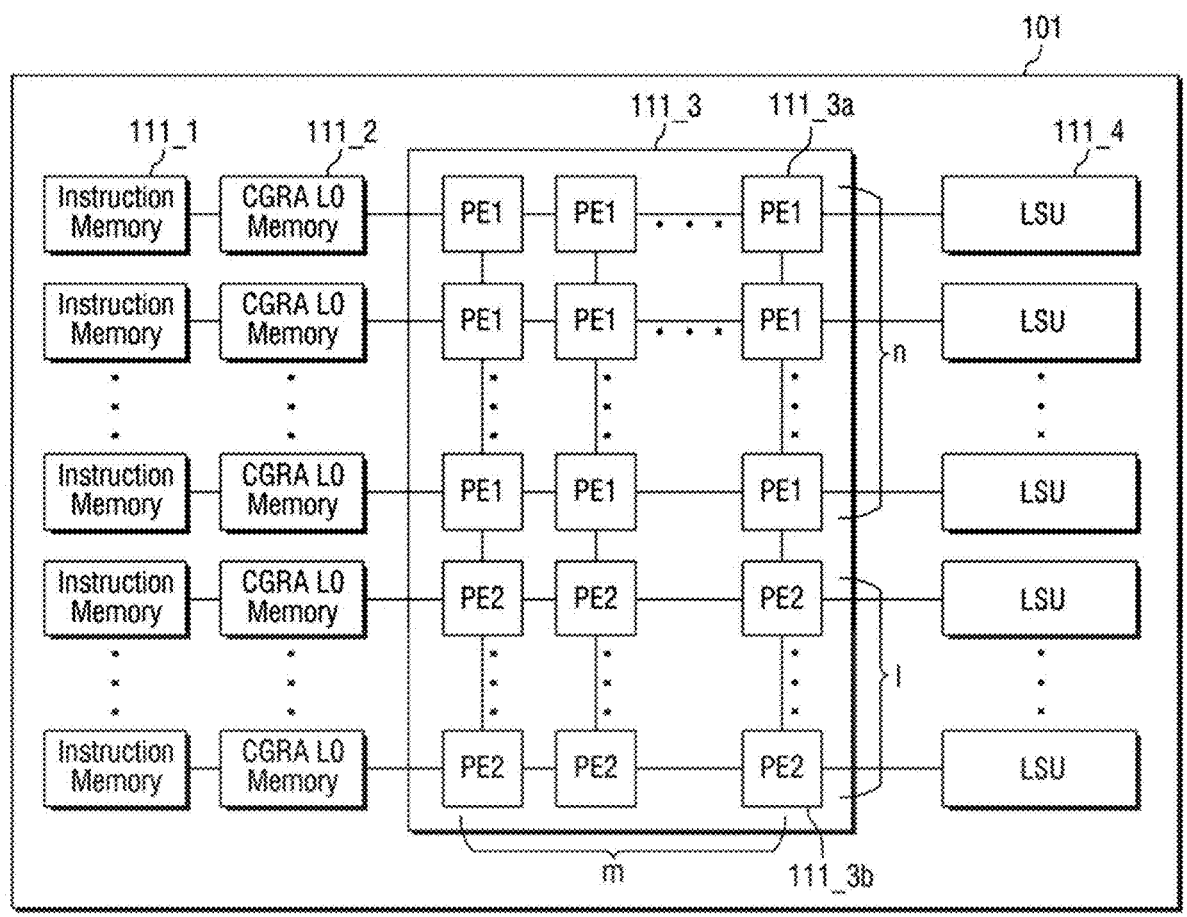
FIG. 18 is a block diagram for illustrating the structure of the neural processing device of FIG. 1 in detail.

FIG. 18 is a block diagram for illustrating in detail the structure of the neural processing device in accordance with some embodiments of the disclosure.

Referring to FIG. 18, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

The instruction memory 111_1 may receive and store instructions. The instruction memory 111_1 may sequentially store instructions internally, and provide the stored instructions to the PE array 111_3. In some embodiments, the instructions may instruct the operation of the first type of a plurality of processing elements 111_3a included in each PE array 111_3.

The CGRA L0 memory 111_2 may be located inside the neural core 101, receive all input data required for tasks of the neural core 101, and temporarily store the data. In addition, the CGRA L0 memory 111_2 may temporarily store output data calculated by the neural core 101 to transmit the data to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) that is lower than L1. In some embodiments, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include the first type of the plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3*b* may be arranged in m columns. In addition, the first type of the plurality of processing elements 111_3*a* may be arranged in n rows, and the second type of the plurality of processing elements 111_3*b* may be arranged in 1 rows. Accordingly, the first type of the plurality of processing elements 111_3*a* and the second type of the plurality of processing element 111_3*b* may be arranged in (n+1) rows and m columns.

The LSU 111_4 may receive at least one of data, a control signal, or a synchronization signal from the outside via the local interconnection 200. The LSU 111_4 may transmit at least one of the received data, control signal, or synchronization signal to the CGRA L0 memory 111_2. Similarly, the LSU 111_4 may transfer at least one of the data, control signal, or synchronization signal to the outside via the local interconnection 200.

The neural core 101 may have a CGRA (Coarse Grained Reconfigurable Architecture) structure. Accordingly, in the neural core 101, each of the first type of the plurality of processing elements 111_3*a* and the second type of the plurality of processing elements 111_3*b* of the PE array 111_3 may be connected to at least one of the CGRA L0 memory 111_2, the instruction memory 111_1, or the LSU 111_4. In some embodiments, the first type of the plurality of processing elements 111_3*a* and the second type of the plurality of processing elements 111_3*b* do not have to be connected to all of the CGRA L0 memory 111_2, the instruction memory 111_1, and the LSU 111_4, but may be connected to some thereof.

Further, the first type of the plurality of processing elements 111_3*a* and the second type of the plurality of processing elements 111_3*b* may be different types of processing elements from each other. Accordingly, out of the CGRA L0 memory 111_2, the instruction memory 111_1, and the LSU 111_4, the elements connected to the first type of the plurality of processing elements 111_3*a* and the elements connected to the second type of the plurality of processing elements 111_3*b* may be different from each other.

The neural core 101 of the disclosure having a CGRA structure enables high-level parallel calculations, and since direct data exchange between the first type of the plurality of processing elements 111_3*a* and the second type of the plurality of processing elements 111_3*b* is possible, the power consumption may be low. In addition, by including two or more types of processing elements, optimization according to various calculation tasks may also be possible.

For example, if the first type of the plurality of processing elements 111_3*a* are processing elements that perform two-dimensional calculations, the second type of the plurality of processing elements 111_3*b* may be processing elements that perform one-dimensional calculations. However, the embodiment is not limited thereto.

Figure 19:
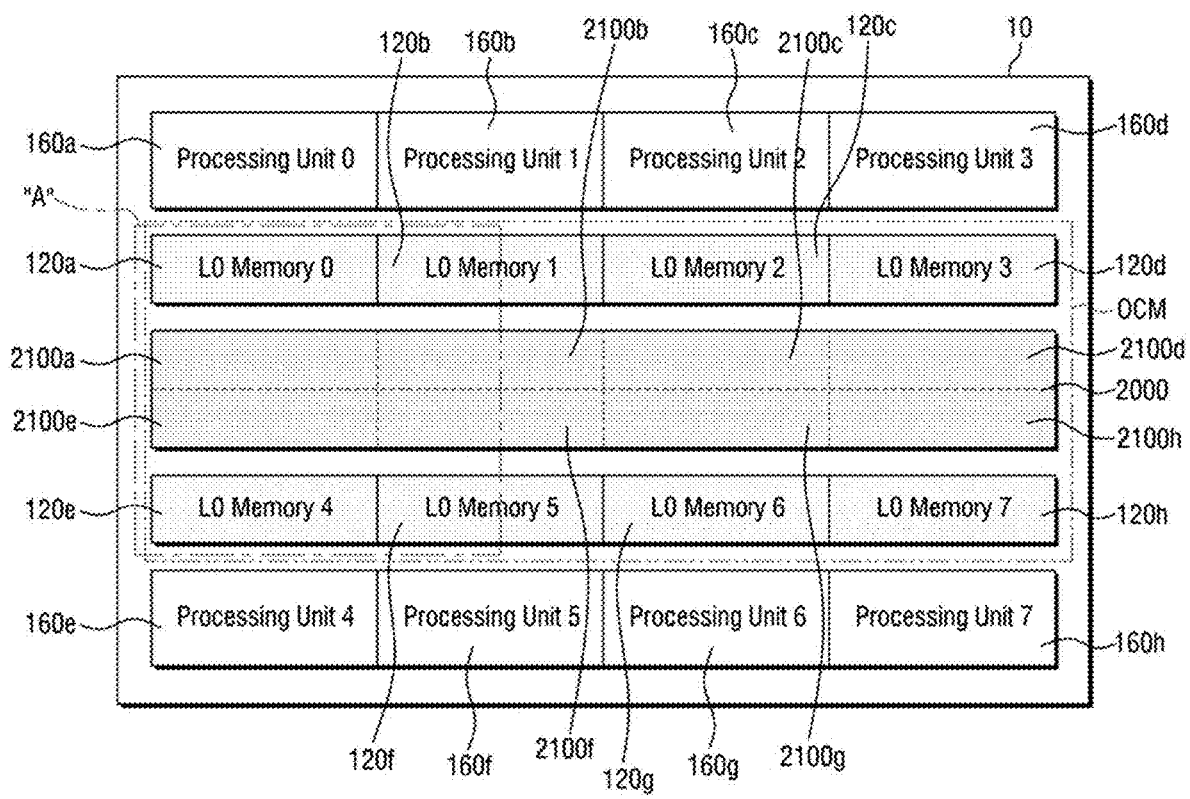
FIG. 19 is a block diagram for illustrating the memory reconstruction of the neural processing system of FIG. 1.

FIG. 19 is a block diagram for illustrating memory reconfiguration of a neural processing system in accordance with some embodiments of the disclosure.

Referring to FIG. 19, the neural core SoC 10 may include first to eighth processing units 160*a* to 160*h* and an on-chip memory OCM. Although FIG. 19 illustrates eight processing units as an example, this is merely illustrative, and the number of processing units may vary as desired.

The on-chip memory OCM may include first to eighth L0 memories 120*a* to 120*h* and a shared memory 2000.

The first to eighth L0 memories 120*a* to 120*h* may be used as private memories for the first to eighth processing units 160*a* to 160*h*, respectively. In some embodiments, the first to eighth processing units 160*a* to 160*h* and the first to eighth L0 memories 120*a* to 120*h* may correspond to each other 1:1.

The shared memory 2000 may include first to eighth memory units 2100*a* to 2100*h*. The first to eighth memory units 2100*a* to 2100*h* may correspond to the first to eighth processing units 160*a* to 160*h* and the first to eighth L0 memories 120*a* to 120*h*, respectively. In some embodiments, the number of memory units may be eight, which is the same as the number of processing units and L0 memories.

The shared memory 2000 may operate in one of two kinds of on-chip memory types. In some embodiments, the shared memory 2000 may operate in one of a L0 memory type or a global memory type. In some embodiments, the shared memory 2000 may implement two types of logical memories with one piece of hardware.

If the shared memory 2000 is implemented in the L0 memory type, the shared memory 2000 may operate as a private memory for each of the first to eighth processing units 160*a* to 160*h*, just like the first to eighth L0 memories 120*a* to 120*h*. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160*a* and the second processing unit 160*b* together. In some embodiments, the shared memory 2000 may be shared not only by the first to eighth processing units 160*a* to 160*h* but also by the first to eighth L0 memories 120*a* to 120*h*.

The global memory may generally use a lower clock compared with the L0 memory, but is not limited thereto. When the shared memory 2000 operates in the global memory type, the first to eighth processing units 160*a* to 160*h* may share the shared memory 2000. In some embodiments, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In some embodiments, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 20:
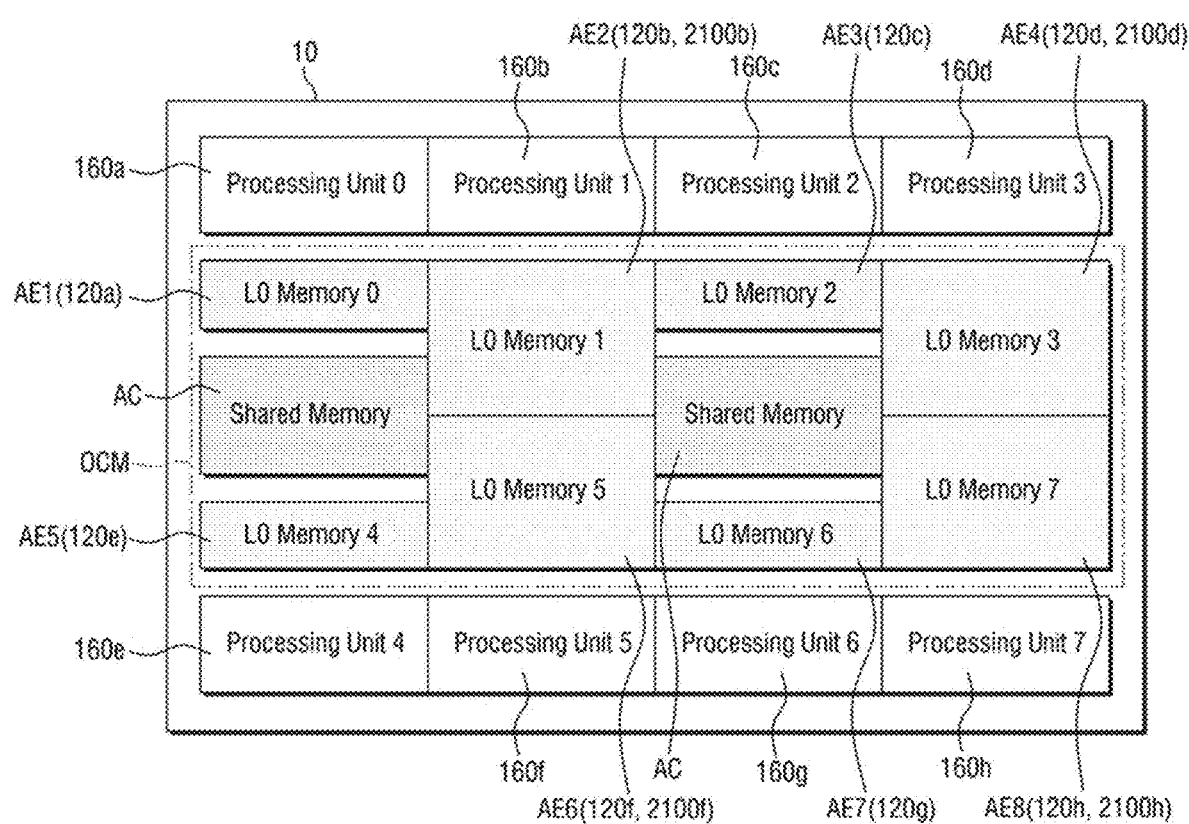
FIG. 20 is a block diagram showing an example of the memory reconstruction of the neural processing system of FIG. 1.

FIG. 20 is a block diagram showing an example of memory reconstruction of a neural processing system in accordance with some embodiments of the disclosure.

With reference to FIGS. 19 and 20, first, third, fifth, and seventh dedicated areas AE1, AE3, AE5, and AE7 for each of the first, third, fifth, and seventh processing units 160*a*, 160*c*, 160*e*, and 160*g* may include only the first, third, fifth, and seventh L0 memories 120*a*, 120*c*, 120*e*, and 120*g*, respectively. Further, second, fourth, sixth, and eighth dedicated areas AE2, AE4, AE6, and AE8 for each of the second, fourth, sixth, and eighth processing units 160*b*, 160*d*, 160*f*, and 160*h* may include second, fourth, sixth, and eighth L0 memories 120*b*, 120*d*, 120*f*, and 120*h*, respectively. In addition, the second, fourth, sixth, and eighth dedicated areas AE2, AE4, AE6, and AE8 may include the second, fourth, sixth, and eighth memory units 2100*b*, 2100*d*, 2100*f*, and 2100*h*. The first, third, fifth, and seventh memory units 2100*a*, 2100*c*, 2100*e*, and 2100*g* of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 2100b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

In some embodiments, each processing unit may perform the same task, but may perform different tasks in other cases as well. In some embodiments, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to calculation tasks during the runtime, and may enhance the efficiency and speed of calculation.

Figure 21:
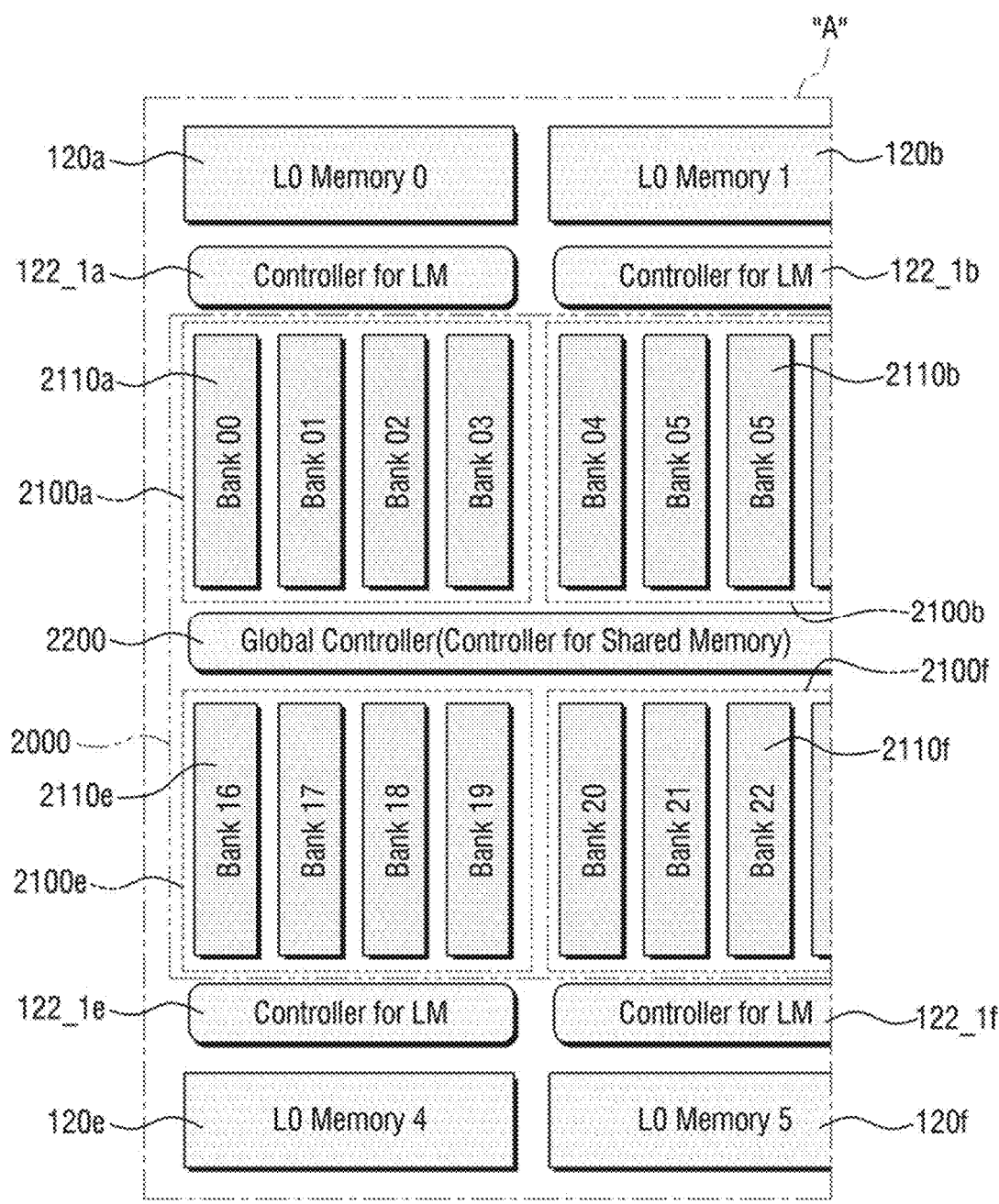
FIG. 21 is an enlarged block diagram of a portion A of FIG. 19.

FIG. 21 is an enlarged block diagram of a portion A of FIG. 19.

With reference to FIGS. 19 and 21, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a, the second L0 memory controller 122_1b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, each of the first L0 memory controller 122_1a, the second L0 memory controller 122_1b, the fifth L0 memory controller 122_1e, the sixth L0 memory controller 122_1f, and the global controller 2200 may be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In some embodiments, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In some embodiments, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In some embodiments, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when each of the first to eighth memory units 2100a to 2100h operate logically in the global memory type (i.e., when they do not operate logically in the L0 memory type).

In some embodiments, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

Each of L0 memory controllers including the first L0 memory controller 122_1a, the second L0 memory controller 122_1b, the fifth L0 memory controller 122_1e, and the sixth L0 memory controller 122_1f may include the LSU 110 of FIG. 7.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 2 by the control of the global controller 2200 or may exchange data with the first to eighth L0 memories 120a to 120h, respectively.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 21 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

each of the first memory banks 2110a may operate logically in the L0 memory type or operate logically in the global memory type. In some embodiments, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In some embodiments, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In some embodiments, the third area and the fourth area do not necessarily coexist, and any one area may take up the entire first memory unit 2100a.

In some embodiments, the ratio of the first area to the second area may be different from the ratio of the third area to the fourth area. However, the embodiment is not limited thereto. Therefore, the ratio of the first area to the second area may be the same as the ratio of the third area to the fourth area. In some embodiments, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments of the disclosure may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 22:
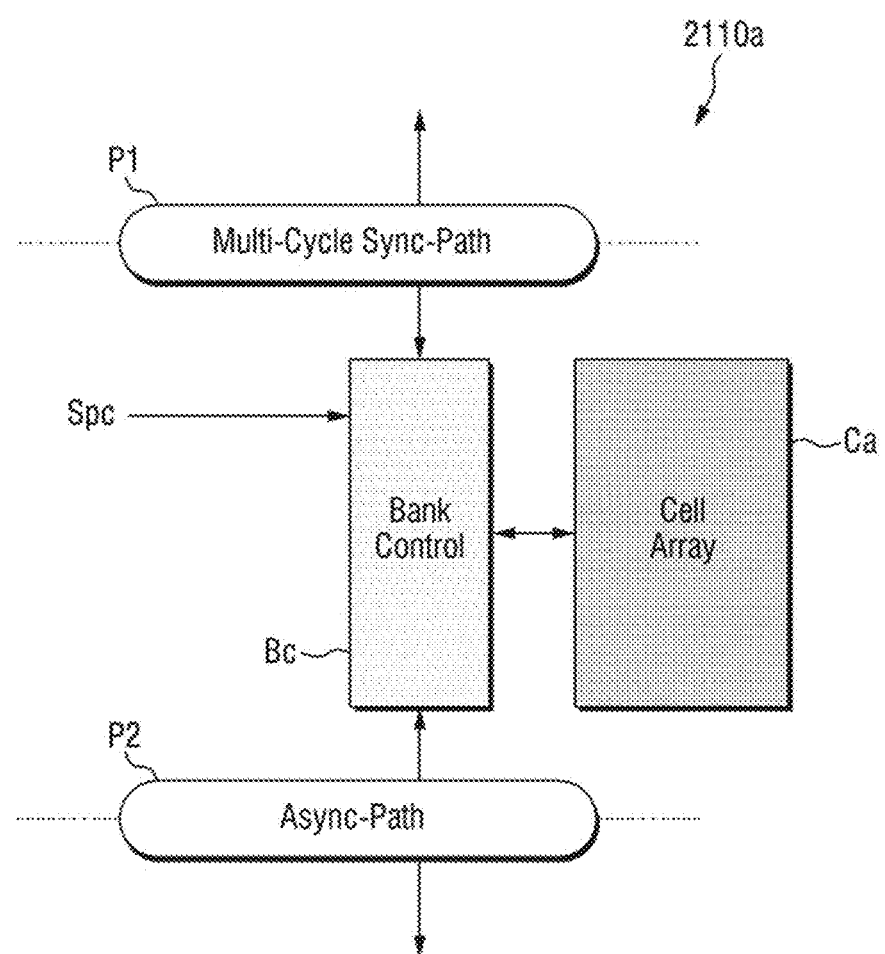
FIG. 22 is a diagram for illustrating the first memory bank of FIG. 21 in detail.

FIG. 22 is a diagram for illustrating the first memory bank of FIG. 21 in detail. Although FIG. 22 illustrates the first memory bank 2110a, other memory banks may also have the same structure as the first memory bank 2110a.

Referring to FIG. 22, the first memory bank 2110a may include a cell array Ca, a bank controller Bc, a first path unit P1, and a second path unit P2.

In some embodiments, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, each of the bank controller Bc, the first path unit P1, and the second path unit P2 may be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In some embodiments, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In some embodiments, a first interface may be used when the bank controller Bc exchanges data with the first path unit P1, and a second interface may be used when the bank controller Bc exchanges data with the second path unit P2. In some embodiments, the first interface and the second interface may be different from each other.

Also, address systems in which data are stored may vary as well. In some embodiments, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In some embodiments, "directly" may mean being exchanged with each other without going through the global interconnection 6000. In some embodiments, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 21.

The first path unit P1 may form a multi-cycle sync-path. In some embodiments, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In some embodiments, the operating clock frequency of the first path unit P1 may be multiples of the operating clock frequency of the bank controller Bc. In some embodiments, a clock domain crossing (CDC) operation for synchronizing the clocks between the bank controller Bc and the first path unit P1 is not required separately, and thus, a delay of data transmission may not occur. Accordingly, faster and more efficient data exchange can be possible.

In the embodiment shown in FIG. 22, an operating clock frequency of the first path unit P1 may be 1.5 GHz, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In some embodiments, the first processing unit 160a may exchange data with the cell array Ca via the global interconnection 6000 and the second path unit P2. In some embodiments, the cell array Ca may exchange data not only with the first processing unit 160a but also with other processing units.

In some embodiments, the second path unit P2 may be a data exchange path between the cell array Ca and all the processing units when the first memory bank 2110a is implemented logically in the global memory type. The second path unit P2 may include the global controller 2200 of FIG. 21.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 22, the operating clock frequency of the second path unit P2 may not be synchronized with the operating clock frequency of the bank controller Bc. In some embodiments, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In some embodiments, the bank controller Bc may use a first address system if exchanging data via the first path unit P1 and a second address system if exchanging data via the second path unit P2. In some embodiments, the first address system and the second address system may be different from each other.

A bank controller Bc is not necessarily required for each memory bank. In some embodiments, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Bc may exist for each memory bank. In some embodiments, the bank controller Bc may control each memory bank individually.

Referring to FIG. 21 and FIG. 22, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In some embodiments, the first address system and the third address system may be the same as each other. However, the embodiment is not limited thereto.

The first address system and the third address system may be used exclusively for the first processing unit 160a and the second processing unit 160b, respectively. The second address system may be commonly applied to the first processing unit 160a and the second processing unit 160b.

In FIG. 22, the operating clock frequency of the second path unit P2 may operate at 1 GHz, as an example. This may be a frequency that is not synchronized with the operating clock frequency of 750 MHz of the bank controller Bc. In some embodiments, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 23:
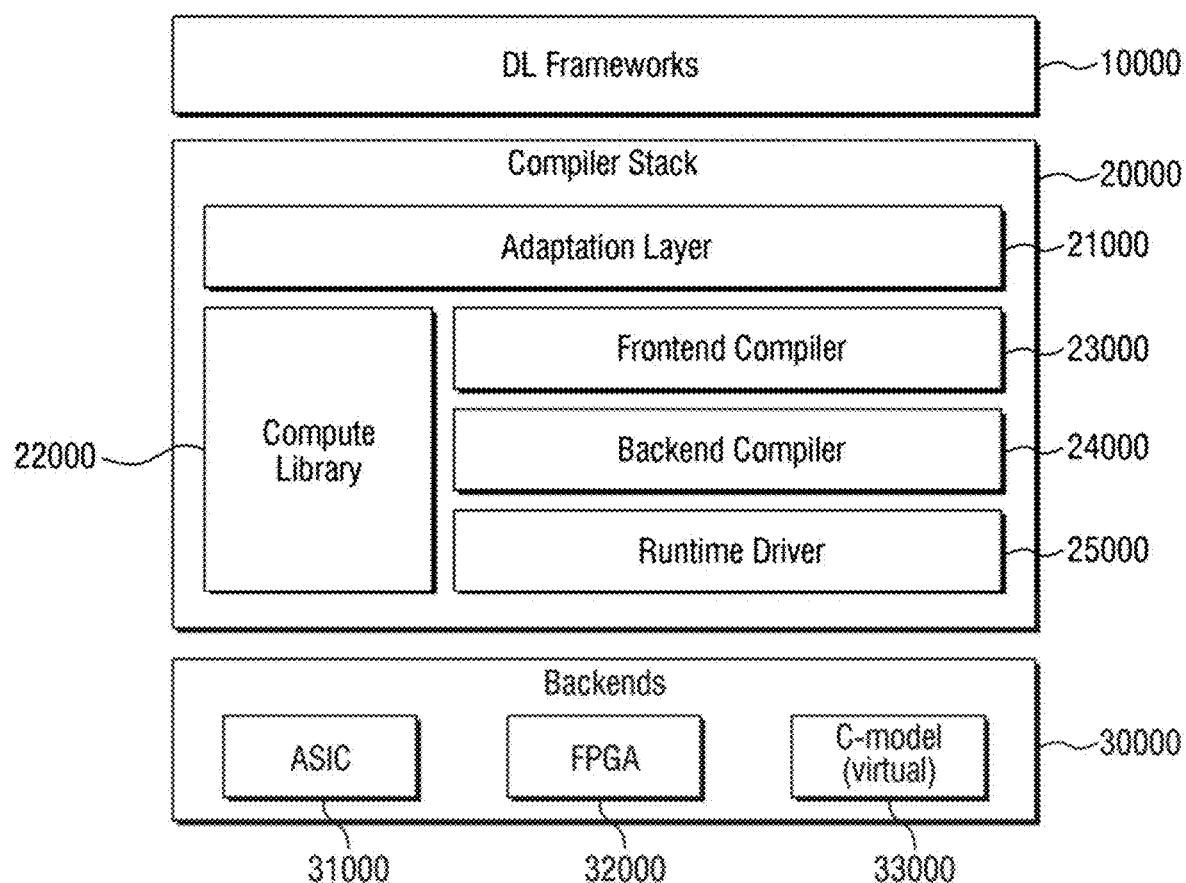
FIG. 23 is a block diagram for illustrating a software hierarchy of a neural processing device in accordance with some embodiments of the disclosure.

FIG. 23 is a block diagram for illustrating a software hierarchy of a neural processing device in accordance with some embodiments.

Referring to FIG. 23, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 24:
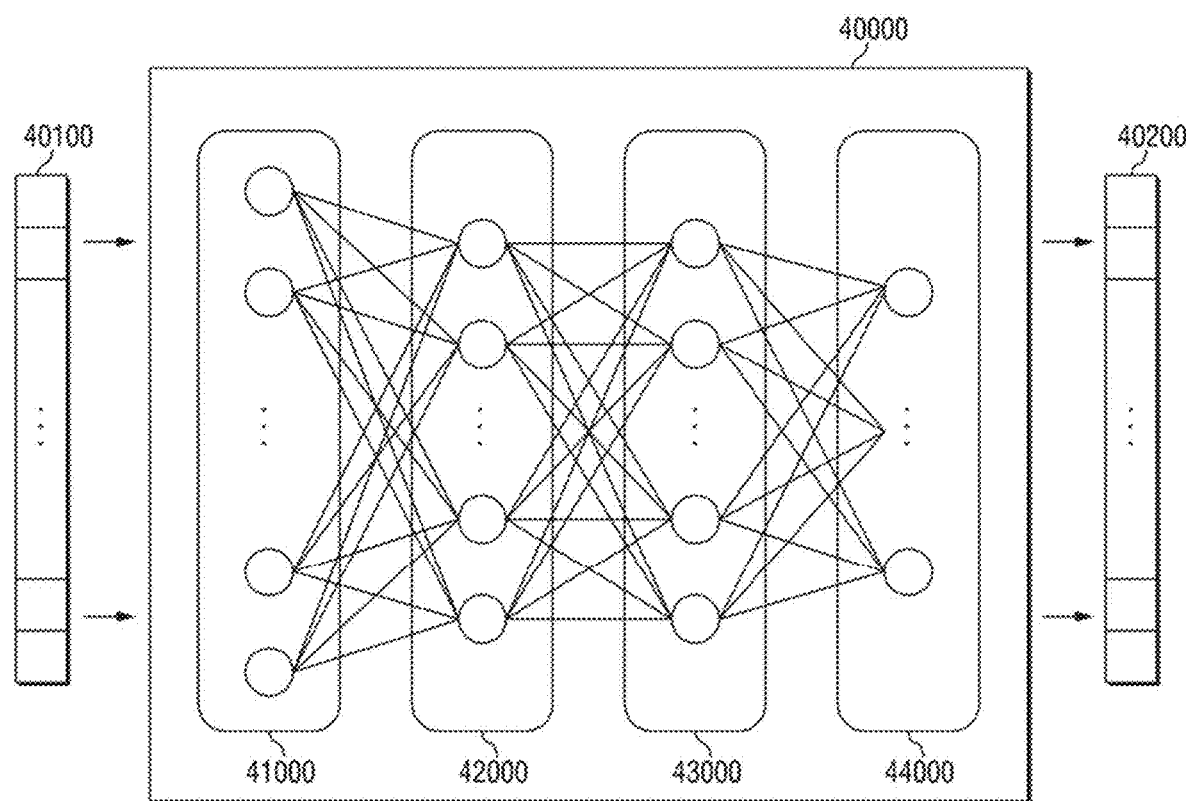
FIG. 24 is a conceptual diagram for illustrating deep learning calculations performed by a neural processing device in accordance with some embodiments of the disclosure.

FIG. 24 is a conceptual diagram for illustrating deep learning calculations performed by a neural processing device in accordance with some embodiments.

Referring to FIG. 24, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

The artificial neural network model 40000 may be implemented by a multilayer perceptron (MLP) including multi-layer nodes and connections between them. An artificial neural network model 40000 in accordance with the embodiment may be implemented using one of various artificial neural network model structures including the MLP. As shown in FIG. 24, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 25:
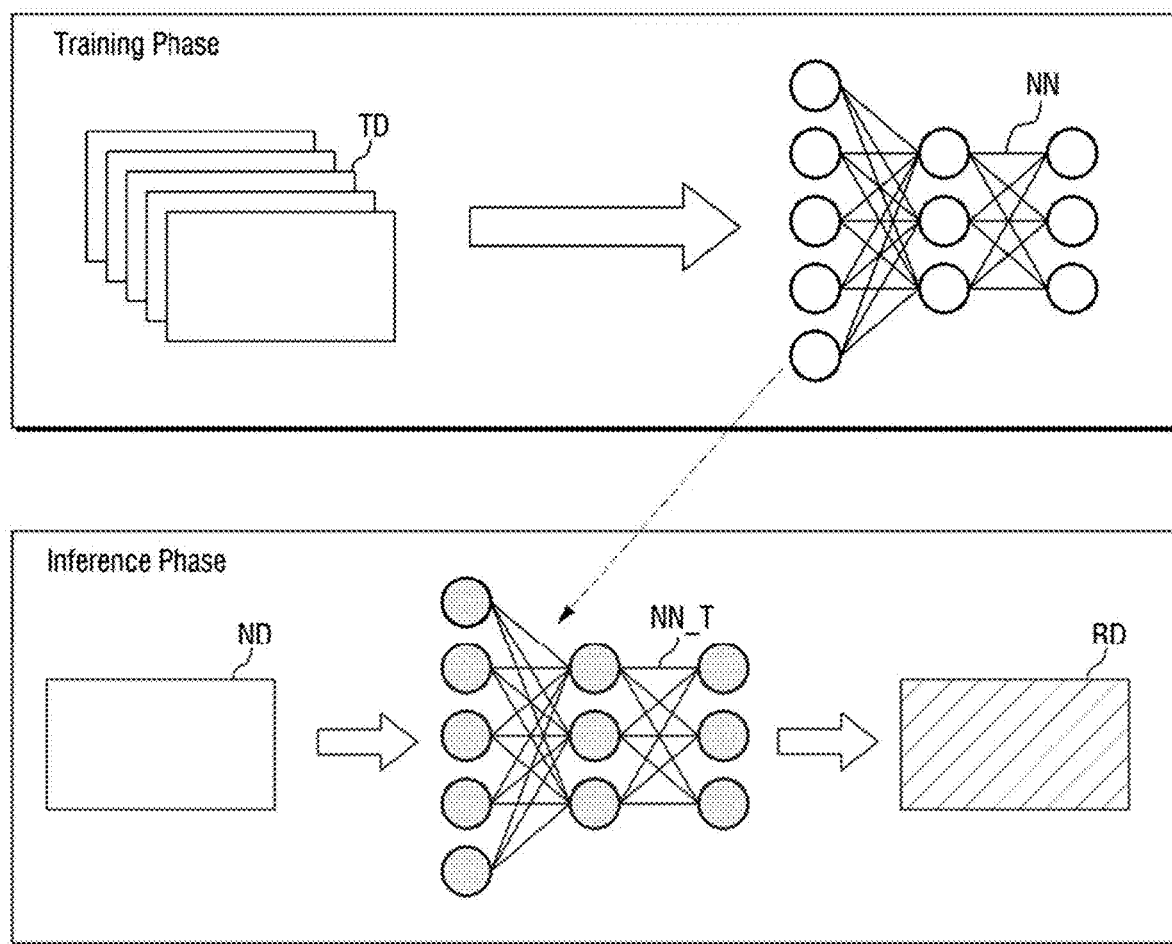
FIG. 25 is a conceptual diagram for illustrating training and inference operations of a neural network of a neural processing device in accordance with some embodiments of the disclosure.

FIG. 25 is a conceptual diagram for illustrating training and inference operations of a neural network of a neural processing device in accordance with some embodiments.

Referring to FIG. 25, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, a method for operating various formats of a neural processing device in accordance with some embodiments of the disclosure will be described with reference to FIGS. 10, 11, and 26 to 28. Any description overlapping with the embodiments described above will be omitted or simplified.

Figure 26:
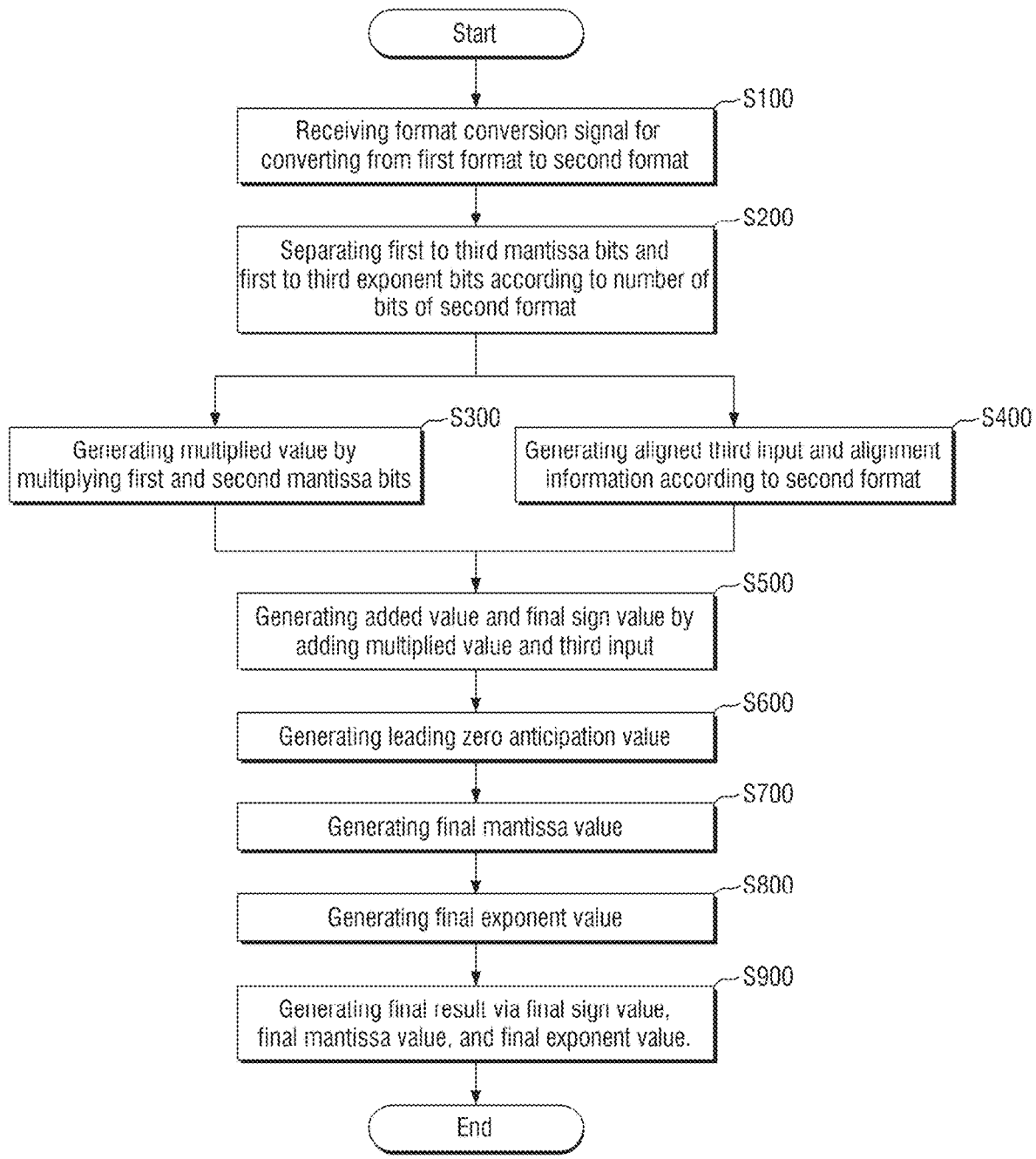
FIG. 26 is a flowchart for illustrating a method in accordance with some embodiments of the disclosure.
Figure 27:
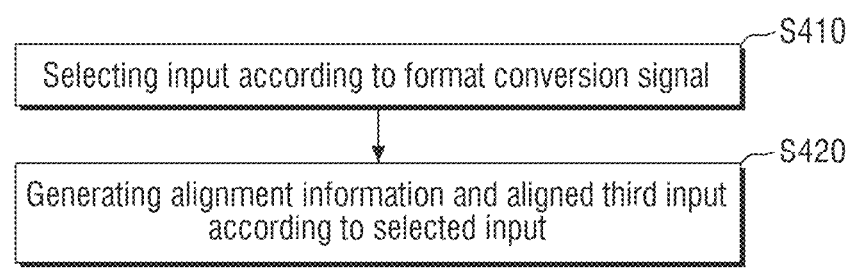
FIG. 27 is a flowchart for illustrating generating the aligned third input and alignment information of FIG. 26 in detail.
Figure 28:
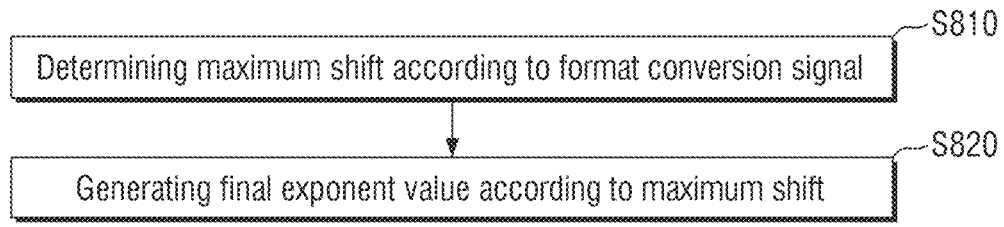
FIG. 28 is a flowchart for illustrating generating the final exponent value of FIG. 26 in detail.

FIG. 26 is a flowchart for illustrating a method in accordance with some embodiments of the disclosure, and FIG. 27 is a flowchart for illustrating generating the aligned third input and alignment information of FIG. 26 in detail. FIG. 28 is a flowchart for illustrating generating the final exponent value of FIG. 26 in detail.

Referring to FIG. 26, a format conversion signal for converting from a first format into a second format is received at S100.

Specifically, referring to FIGS. 10 and 11, the unpacker upk may receive a format conversion signal Form_en. The unpacker upk may perform unpacking in a first format before receiving the format conversion signal Form_en. When the unpacker upk receives the format conversion signal Form_en, the unpacker upk may perform unpacking in a second format.

Further, the aligner algn may receive the format conversion signal Form_en. The aligner algn may perform an operation in the first format before receiving the format conversion signal Form_en. When the aligner algn receives the format conversion signal Form_en, the aligner algn may perform an operation in the second format.

The normalizer nrm may receive the format conversion signal Form_en. The normalizer nrm may perform an operation in the first format F1 before receiving the format conversion signal Form_en. When the normalizer nrm receives the format conversion signal Form_en, the normalizer nrm may perform an operation in the second format F2.

The exponent corrector exc may receive the format conversion signal Form_en. The exponent corrector exc may perform an operation in the first format F1 before receiving the format conversion signal Form_en. When the exponent corrector exc receives the format conversion signal Form_en, the exponent corrector exc may perform an operation in the second format F2.

Referring again to FIG. 26, first to third mantissa bits and first to third exponent bits are separated according to a number of bits of the second format at S200.

Specifically, referring to FIG. 10, the unpacker upk may receive a first input In1, a second input In2, and a third input In3. The unpacker upk may extract a first mantissa Mts1 and a first exponent Ex1 from the first input In1. Further, the unpacker upk may extract a second mantissa Mts2 and a second exponent Ex2 from the second input In2. In some embodiments, the unpacker upk may extract the mantissa and exponent based on the first format or the second format according to the format conversion signal Form_en.

Referring again to FIG. 26, a multiplied value is generated by multiplying the first mantissa and the second mantissa at S300.

Specifically, referring to FIG. 10, the bit manipulation unit bu may receive the first mantissa Mts1 and the second mantissa Mts2 and generate a multiplied value Mul of the two mantissas. The two mantissas may be values originating from the first input In1 and the second input In2.

Referring again to FIG. 26, alignment information is generated at S400.

In detail, referring to FIG. 27, an input is selected according to the format conversion signal at S410.

Specifically, referring to FIGS. 10 and 12A, the input selector Is may determine adjustment information Ia according to the format conversion signal Form_en.

The adjustment information Ia may be information converted by selecting existing pieces of information about the first format F1 to suit the second format F2 via an operation at a gate level. In some embodiments, the adjustment information Ia may be generated by adjusting various coefficients and constants. In addition, the adjustment information Ia may be a value obtained by adjusting the existing first exponent Ex1, second exponent Ex2, third exponent Ex3, and sign difference signal Sp according to the converted format.

Referring to FIG. 27, alignment information and an aligned third input are generated according to the selected input at S420.

Specifically, referring to FIGS. 10 and 12A, the shift amount determiner sad may generate the alignment information Alg and the initial exponent value excr via the adjustment information Ia. The shift amount determiner sad may be implemented as logic that adds a sum and a carry in a form of a carry-save adder, but the embodiment is not limited thereto.

The third input may be prepared in both the first and second formats, and may be added in the selected format later according to the presence or absence of the format conversion signal. Referring again to FIG. 26, an added value and a final sign value are generated by adding the multiplied value and the third input at S500.

Specifically, referring to FIG. 10, the adder ad may receive the multiplied value Mul, the sign difference signal Sp and the alignment information Alg. The adder ad may add the value of the aligned third input newly aligned according to the sign difference signal Sp and the alignment information Alg to the multiplied value Mul. Accordingly, the adder ad may generate an added value add. In some embodiments, the added value add may include a sum and a carry. In addition, the added value add may include information capable of identifying a case in which all values are zero. Furthermore, a final sign value Sgn_f may be generated via the alignment information Alg and the sign difference signal Sp.

Referring again to FIG. 26, a leading zero anticipation value is generated at S600.

Specifically, referring to FIG. 10, the leading zero anticipator lz may receive the added value add from the adder ad. The leading zero anticipator lz may perform shift logic later, and generate a leading zero anticipation value lza. The leading zero anticipator lz may transmit the leading zero anticipation value lza to the normalizer nrm and the exponent corrector exc.

Referring again to FIG. 26, a final mantissa value is generated at S700.

Specifically, referring to FIG. 10, the normalizer nrm may generate a final mantissa value Mts_f via a normalization task of the added value add. In some embodiments, the leading zero anticipation value lza may be used.

Referring again to FIG. 26, a final exponent value is generated at S800.

In detail, referring to FIG. 28, a maximum shift is determined according to the format conversion signal at S810.

Specifically, referring to FIGS. 10, 11 and 13, the maximum shift calculator ms may generate an exponent correction value excr1 by using the format conversion signal Form_en, the initial exponent value excr, and the leading zero anticipation value lza. The exponent correction value excr1 may be a corrected exponent value according to a currently used format out of the first format F1 and the second format F2. The maximum shift mxsht may be used to define overflow value and underflow value according to each format via the format conversion signal Form_en and the leading zero anticipation value lza.

Referring again to FIG. 28, a final exponent value is generated according to the maximum shift at S820.

Specifically, referring to FIGS. 10, 11 and 13, the corrector crt may generate a final exponent, i.e., the final exponent value Exp_f via the exponent correction value excr1 and the maximum shift mxsht.

Referring again to FIG. 26, a final result is generated via the final sign value, the final mantissa value and the final exponent value at S900.

Figure 29:
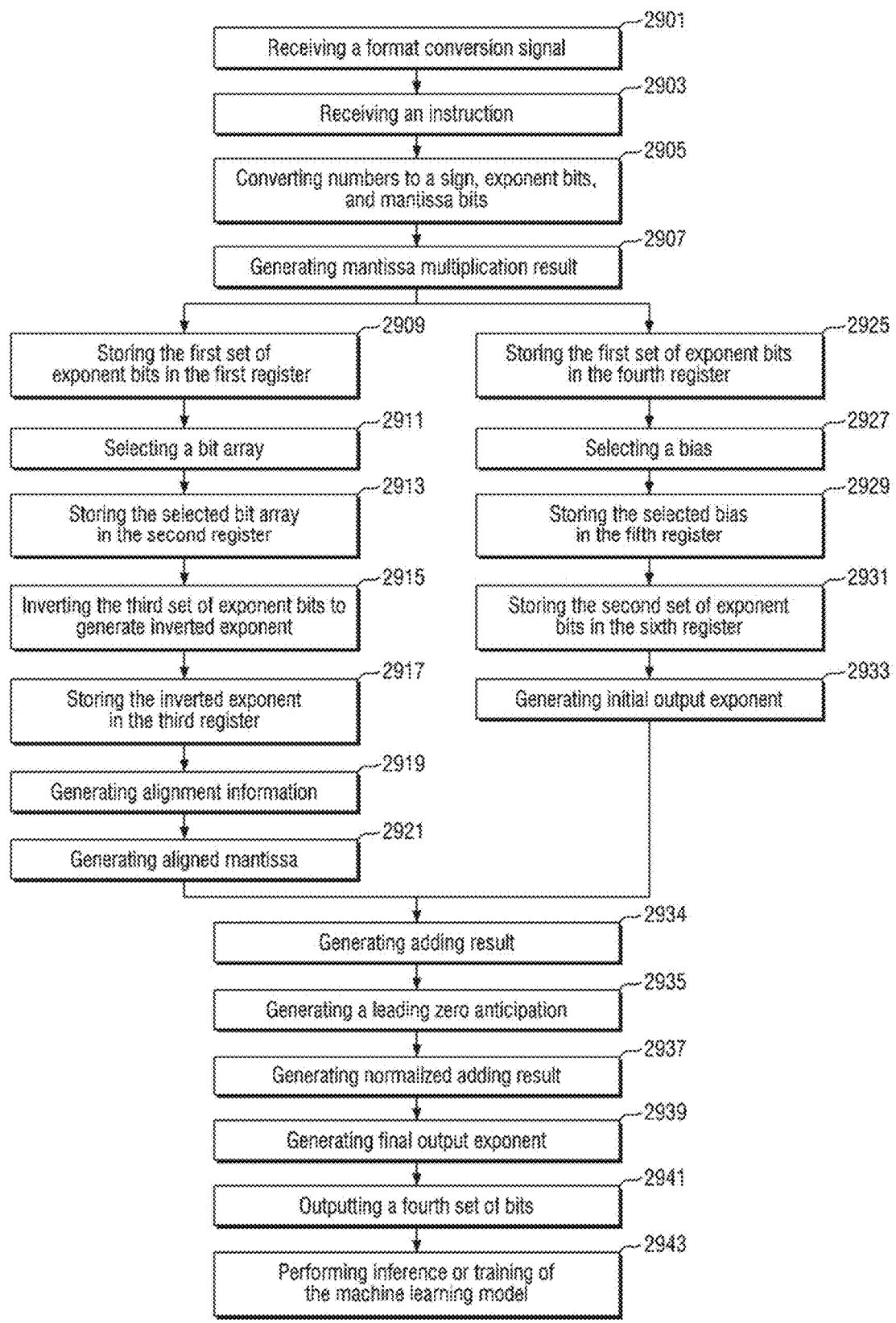
FIG. 29 is a flowchart illustrating a processing method in accordance with some embodiments.

FIG. 29 is a flowchart illustrating a processing method in accordance with some embodiments.

At 2901, the processing element 163_1 may receive a format conversion signal Form_en indicating a format of floating-point numbers between a first format and a second format. In some embodiments, the format conversion signal Form_en may be triggered by a machine learning model or a software.

At 2903, the processing element 163_1 may receive an instruction including a first set of bits $X[N_F-1:0]$ representing a first floating-point number In1, a second set of bits $Y[N_F-1:0]$ representing a second floating-point number In2, and a third set of bits $Z[N_F-1:0]$ representing a third floating-point number In3. In some embodiments, the first floating-point number, the second floating-point number, and the third floating-point number may be floating-point tensors.

At 2905, the unpacker upk of the processing element 163_1 may convert floating-point numbers to a sign bit, exponent bits, and mantissa bits based on the format conversion signal Form_en. In some embodiments, the processing element 163_1 may convert the first set of bits $X[N_F-1:0]$ to a first sign bit $SX[0]$, a first set of exponent bits $EX[N_E-1:0]$ and a first set of mantissa bits $MX[N_M-1:0]$ based on the format conversion signal Form_en. The processing element 163_1 may convert the second set of bits $Y[N_F-1:0]$ to a second sign bit $SY[0]$, a second set of exponent bits $EY[N_E-1:0]$ and a second set of mantissa bits $MY[N_M-1:0]$ based on the format conversion signal Form_en. The processing element 163_1 may convert the third set of bits $Z[N_F-1:0]$ to a third sign bit $SZ[0]$, a third set of exponent bits $EZ[N-1:0]$ and a third set of mantissa bits $MZ[N_M-1:0]$ based on the format conversion signal Form_en. The number $N_M$ may be equal to or greater than a maximum number of the number $N_{M1}$ of mantissa bits in the first format and the number $N_{M2}$ of mantissa bits in the second format.

In some embodiments, if the first format is Dlfloat, $N_F$ may be equal to 16, $N_{E1}$ may be equal to 6, and $N_{M1}$ may be equal to 9. In some embodiments, if the second format is Bfloat, $N_F$ may be equal to 16, $N_{E2}$ may be equal to 8, and $N_{M2}$ may be equal to 7. In some embodiments, if the first format is Dlfloat and the second format is Bfloat, $N_E$ and $N_M$ may be equal to 8 and 9, respectively. In some embodiments, in a case that the first format is Dlfloat and the second format is Bfloat, if the format conversion signal Form_en indicates the second format, $MX[N_M-1:0]$ may be set equal to $\{X[N_{M2}-1:0], \text{"00"}\}$, $MY[N_M-1:0]$ may be set equal to $\{Y[N_{M2}-1:0], \text{"00"}\}$, $MZ[N_M-1:0]$ may be set equal to $\{Z[N_{M2}-1:0], \text{"00"}\}$, $EX[N_E-1:0]$ may be set equal to $\{X[N_{E2}+N_{M2}-1: N]\}$, $EY[N_E-1:0]$ may be set equal to $\{Y[N_{E2}+N_{M2}-1: N_{M2}]\}$, and $EZ[N_E-1:0]$ may be set equal to $\{Z[N_{E2}+N_{M2}-1: N]\}$. In some embodiments, in a case that the first format is Dlfloat and the second format is Bfloat, if the format conversion signal Form_en indicates the first format, $MX[N_N-1:0]$ may be set equal to $\{X[N_{M1}-1:0]\}$, $MY[N_M-1:0]$ may be set equal to $\{Y[N_{M1}-1:0]\}$, $MZ[N_M-1:0]$ may be set equal to $\{Z[N_{M1}-1:0]\}$, $EX[N_E-1:0]$ may be set equal to $\{\text{"00"}, X[N_{E1}+N_{M1}-1: N]\}$, $EY[N_E-1:0]$ may be set equal to $\{\text{"00"}, Y[N_{M1}+N_{M1}-1: N]\}$, and $EZ[N_E-1:0]$ may be set equal to $\{\text{"00"}, Z[N_{E1}+N_{M1}-1: N]\}$.

At 2907, the BMU bu of the processing element 163_1 may multiply the first set of mantissa bits $MX[N_M-1:0]$ and the second set of mantissa bits $MY[N_M-1:0]$ to generate mantissa multiplication result bits $MUL[N_M-1:0]$.

At 2909, the processing element 163_1 may store the first set of exponent bits $EX[N_E-1:0]$ in the first register U15.

At 2911, the processing element 163_1 may select a bit array $BA[N_E-1:0]$ between a first bit array $BA1[N_E-1:0]$ and a second bit array $BA2[N_E-1:0]$ based on the format conversion signal Form_en as described in accordance with FIG. 12B.

At 2913, the processing element 163_1 may store the selected bit array $BA[N_E-1:0]$ in the second register U16.

At 2915, the processing element 163_1 may invert the third set of exponent bits $EZ[N_E-1:0]$ to generate inverted exponent bits $!EZ[N_E-1:0]$.

At 2917, the processing element 163_1 may store the inverted exponent bits $!EZ[N_E-1:0]$ in the third register U17.

At 2919, as described in accordance with FIG. 12B, the processing element 163_1 may add the bits in the first register U15, the bits in the second register U16, and the bits in the third register U17 to generate alignment information Alg.

At 2921, the aligner algn of the processing element 163_1 may align the third set of mantissa bits $MZ[N_M-1:0]$ with the mantissa multiplication result bits $MUL[N_M-1:0]$ based on the alignment information Alg to generate aligned mantissa bits $AMZ[N_M-1:0]$.

At 2925, the processing element 163_1 may store the first set of exponent bits $EX[N_E-1:0]$ in the fourth register U25.

At 2927, as described in accordance with FIG. 12C, the processing element 163_1 may select a bias between a first bias value and a second bias value based on the format conversion signal Form_en.

At 2931, the processing element 163_1 may store the selected bias in the fifth register U26.

At 2929, the processing element 163_1 may store the second set of exponent bits $EY[N_E-1:0]$ in the sixth register U27.

At 2934, as described in accordance with FIG. 12C, the processing element 163_1 may add the bits in the fourth register U25, the bits in the fifth register U26, and the bits in the sixth register U27 to generate initial output exponent bits $EO1[N_E-1:0]$.

At 2923, the adder ad of the processing element 163_1 may add the aligned mantissa bits $AMZ[N_M-1:0]$ and the mantissa multiplication result bits $MUL[N_M-1:0]$ to generate adding result bits $ADD[N_M-1:0]$.

At 2935, the leading zero anticipator lz of the processing element 163_1 may find a location of the foremost one in the adding result bits $ADD[N_M-1:0]$ to generate a leading zero anticipation lsa.

At 2937, the normalizer nrm of the processing element 163_1 may normalize the adding result bits $ADD[N_M-1:0]$ based on the leading zero anticipation lsa to generate normalized adding result bits $NADD[N_M-1:0]$.

At 2939, the exponent corrector exc of the processing element 163_1 may adjust the initial output exponent bits $EO1[N_E-1:0]$ based on the leading zero anticipation lsa and the overflow signal Ovf_sig to generate final output exponent bits $EO[N_E-1:0]$.

At 2941, the output mux omx of the processing element 163_1 may output a fourth set of bits $Result[N_F-1:0]$ representing an output floating-point number based on the format conversion signal Form_en by using the normalized adding result bits $NADD[N_M-1:0]$ and the final output exponent bits $EO[N_E-1:0]$.

At 2943, the processing device may perform an inference of the machine learning model by using the fourth set of bits $Result[N_F-1:0]$ representing the output floating-point number, and/or train the machine learning model by using the fourth set of bits $Result[N_F-1:0]$ representing the output floating-point number.

Hereinafter, various embodiments will be described.

In various embodiments, a processing device may comprise processing circuitry comprising at least one processor comprising at least one processing element; and a shared memory shared by the at least one processor. The at least one processing element may be configured to cause: receiving a format conversion signal indicating a format of floating-point numbers between a first format and a second format, receiving a first set of bits representing a first floating-point number, a second set of bits representing a second floating-point number, and a third set of bits representing a third floating-point number, converting the first set of bits to a first sign bit, a first set of exponent bits and a first set of mantissa bits based on the format conversion signal, converting the second set of bits to a second sign bit, a second set of exponent bits and a second set of mantissa bits based on the format conversion signal, converting the third set of bits to a third sign bit, a third set of exponent bits and a third set of mantissa bits based on the format conversion signal, performing a computation operation on the first sign, the first set of exponent bits, the first set of mantissa bits, the second sign bit, the second set of exponent bits, the second set of mantissa bits, the third sign bit, the third set of exponent bits, and the third set of mantissa bits, and outputting a fourth set of bits representing an output floating-point number via the computation operation based on the format conversion signal.

In various embodiments, the at least one processing element may be further configured to cause: storing bits associated with the first set of exponent bits in a first register, storing bits associated with the second set of exponent bits in a second register, storing bits associated with the third set of exponent bits in a third register, adding the bits in the first register, the bits in the second register, and the bits in the third register to generate alignment information, and outputting the fourth set of bits based on the alignment information.

In various embodiments, the alignment information may be generated by using a carry save adder circuitry having a bit width equal to a positive margin number added by a maximum number of the number of exponent bits in the first format and the number of exponent bits in the second format and by using a carry-propagate adder adding a sum and a carry outputted from the carry save adder.

In various embodiments, the positive margin number may be equal to or greater than 2.

In various embodiments, the at least one processing element may be further configured to cause: selecting a bit array between a first bit array and a second bit array based on the format conversion signal, the first bit array may be associated with the second set of exponent bits according to the first format, the second bit array may be associated with the second set of exponent bits according to the second format, and the selected bit array may be stored in the second register.

In various embodiments, bits of the first bit array may be set equal to the second set of exponent bits except that bits in the first bit array from a most significant bit of the first bit array to a bit in the first bit array corresponding to a first location of a most significant bit of exponent bits according to the first format in the second set of exponent bits are set equal to an inverted bit of a bit in the second set of exponent bits corresponding to the first location, and bits of the second bit array are may be equal to the second set of exponent bits except that bits in the second bit array from a most significant bit of the second bit array to a bit in the second bit array corresponding to a second location of a most significant bit of exponent bits according to the second format in the second set of exponent bits are set equal to an inverted bit of a bit in the second set of exponent bits corresponding to the second location.

In various embodiments, the at least one processing element may be further configured to cause: inverting the third set of exponent bits to generate inverted exponent bits, the inverted exponent bits may be stored in the third register.

In various embodiments, the first set of exponent bits may be stored in the first register.

In various embodiments, the at least one processing element may be further configured to cause: multiplying the first set of mantissa bits and the second set of mantissa bits to generate mantissa multiplication result bits, aligning the third set of mantissa bits with the mantissa multiplication result bits based on the alignment information to generate aligned mantissa bits, adding the aligned mantissa bits and the mantissa multiplication result bits to generate adding result bits, and outputting the fourth set of bits based on the adding result bits.

In various embodiments, the number of bits in the first register, the second register, and the third register may be equal to or greater than a positive margin number added by a maximum number of the number of exponent bits in the first format and the number of exponent bits in the second format.

In various embodiments, the at least one processing element may be further configured to cause: storing bits associated with the first set of exponent bits in a fourth register, storing bits associated with a bias in a fifth register, storing bits associated with the second set of exponent bits in a sixth register, adding the bits in the fourth register, the bits in the fifth register, and the bits in the sixth register to generate initial output exponent bits, and outputting the fourth set of bits based on the initial output exponent bits.

In various embodiments, the initial output exponent bits may be generated by using a carry save adder circuitry having a bit width equal to a positive margin number added by a maximum number of the number of exponent bits in the first format and the number of exponent bits in the second format and by using a carry-propagate adder adding a sum and a carry outputted from the carry save adder.

In various embodiments, the first set of exponent bits may be stored in the fourth register and the second set of exponent bits are stored in the sixth register.

In various embodiments, the at least one processing element may be further configured to cause: selecting the bias between a first bias value and a second bias value based on the format conversion signal.

In various embodiments, the first bias value may be equal to a default bias value according to the first format plus an additional bias value for aligning a product of the first floating-point number and the second floating-point number and an addend corresponding to the third first floating-point number to a predefined aligning bit width, and the second bias value may be equal to a default bias value according to the second format plus the additional bias value.

In various embodiments, the at least one processing element may be further configured to cause: finding a location of the foremost one in adding result bits to generate a leading zero anticipation; adjusting the initial output exponent bits based on the leading zero anticipation to generate final output exponent bits; normalizing the adding result bits to generate normalized adding result bits; and outputting the fourth set of bits representing the output floating-point number by using the normalized adding result bits and the final output exponent bits.

In various embodiments, the number of the first set of exponent bits may be equal to a maximum number of the number of exponent bits in the first format and the number of exponent bits in the second format, and the number of the first set of mantissa bits may be equal to a maximum number of the number of mantissa bits in the first format and the number of mantissa bits in the second format.

In various embodiments, the first set of bits representing the first floating-point number, the second set of bits representing the second floating-point number, and the third set of bits representing the third floating-point number may be included in an instruction.

In various embodiments, the first floating-point number, the second floating-point number, and the third floating-point number may be floating-point tensors.

In various embodiments, the format conversion signal may be triggered by a machine learning model.

In various embodiments, the processing circuitry may be configured to cause: performing an inference of the machine learning model by using the fourth set of bits representing the output floating-point number.

In various embodiments, the processing circuitry may be configured to cause: training the machine learning model by using the fourth set of bits representing the output floating-point number.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

The invention claimed is:

1. A processing device comprising processing circuitry comprising:
   at least one processor comprising at least one processing element; and
   a shared memory shared by the at least one processor,
   wherein the at least one processing element is configured to cause:
   receiving a format conversion signal indicating a format of floating-point numbers between a first format and a second format,
   receiving a first set of bits representing a first floating-point number, a second set of bits representing a second floating-point number, and a third set of bits representing a third floating-point number,
   converting the first set of bits to a first sign bit, a first set of exponent bits and a first set of mantissa bits based on the format conversion signal,
   converting the second set of bits to a second sign bit, a second set of exponent bits and a second set of mantissa bits based on the format conversion signal,
   converting the third set of bits to a third sign bit, a third set of exponent bits and a third set of mantissa bits based on the format conversion signal,
   performing a computation operation on the first sign, the first set of exponent bits, the first set of mantissa bits, the second sign bit, the second set of exponent bits, the second set of mantissa bits, the third sign bit, the third set of exponent bits, and the third set of mantissa bits, and
   outputting a fourth set of bits representing an output floating-point number via the computation operation based on the format conversion signal,
   wherein the at least one processing element is further configured to cause:
   storing bits associated with the first set of exponent bits in a first register,
   storing bits associated with the second set of exponent bits in a second register,
   storing bits associated with the third set of exponent bits in a third register,
   adding the bits in the first register, the bits in the second register, and the bits in the third register to generate alignment information,
   outputting the fourth set of bits based on the alignment information, and
   selecting a bit array between a first bit array and a second bit array based on the format conversion signal, and
   wherein the first bit array is associated with the second set of exponent bits according to the first format,
   the second bit array is associated with the second set of exponent bits according to the second format, and
   the selected bit array is stored in the second register.

2. The processing device of claim 1, wherein the alignment information is generated by using a carry save adder circuitry having a bit width equal to a positive margin number added by a maximum number of the number of exponent bits in the first format and the number of exponent bits in the second format and by using a carry-propagate adder adding a sum and a carry outputted from the carry save adder, and
wherein the positive margin number is equal to or greater than 2.

3. The processing device of claim 1, wherein
bits of the first bit array are set equal to the second set of exponent bits except that bits in the first bit array from a most significant bit of the first bit array to a bit in the first bit array corresponding to a first location of a most significant bit of exponent bits according to the first format in the second set of exponent bits are set equal to an inverted bit of a bit in the second set of exponent bits corresponding to the first location, and
bits of the second bit array are set equal to the second set of exponent bits except that bits in the second bit array from a most significant bit of the second bit array to a bit in the second bit array corresponding to a second location of a most significant bit of exponent bits according to the second format in the second set of exponent bits are set equal to an inverted bit of a bit in the second set of exponent bits corresponding to the second location.

4. The processing device of claim 1, wherein the at least one processing element is further configured to cause:
inverting the third set of exponent bits to generate inverted exponent bits, and
wherein the inverted exponent bits are stored in the third register.

5. The processing device of claim 1, wherein the first set of exponent bits are stored in the first register.

6. The processing device of claim 1, wherein the at least one processing element is further configured to cause:
multiplying the first set of mantissa bits and the second set of mantissa bits to generate mantissa multiplication result bits,
aligning the third set of mantissa bits with the mantissa multiplication result bits based on the alignment information to generate aligned mantissa bits,
adding the aligned mantissa bits and the mantissa multiplication result bits to generate adding result bits, and
outputting the fourth set of bits based on the adding result bits.

7. The processing device of claim 1, wherein the number of bits in the first register, the second register, and the third register is equal to or greater than a positive margin number added by a maximum number of the number of exponent bits in the first format and the number of exponent bits in the second format.

8. The processing device of claim 1, wherein the at least one processing element is further configured to cause:
storing bits associated with the first set of exponent bits in a fourth register,
storing bits associated with a bias in a fifth register,
storing bits associated with the second set of exponent bits in a sixth register,
adding the bits in the fourth register, the bits in the fifth register, and the bits in the sixth register to generate initial output exponent bits, and
outputting the fourth set of bits based on the initial output exponent bits.

9. The processing device of claim 8, wherein the initial output exponent bits are generated by using a carry save adder circuitry having a bit width equal to a positive margin number added by a maximum number of the number of exponent bits in the first format and the number of exponent bits in the second format and by using a carry-propagate adder adding a sum and a carry outputted from the carry save adder.

10. The processing device of claim 8, wherein the first set of exponent bits are stored in the fourth register and the second set of exponent bits are stored in the sixth register.

11. The processing device of claim 8, wherein the at least one processing element is further configured to cause:
selecting the bias between a first bias value and a second bias value based on the format conversion signal.

12. The processing device of claim 11, wherein
the first bias value is equal to a default bias value according to the first format plus an additional bias value for aligning a product of the first floating-point number and the second floating-point number and an addend corresponding to the third first floating-point number to a predefined aligning bit width, and
the second bias value is equal to a default bias value according to the second format plus the additional bias value.

13. The processing device of claim 8, wherein the at least one processing element is further configured to cause:
finding a location of the foremost one in adding result bits to generate a leading zero anticipation;
adjusting the initial output exponent bits based on the leading zero anticipation to generate final output exponent bits;
normalizing the adding result bits to generate normalized adding result bits;
outputting the fourth set of bits representing the output floating-point number by using the normalized adding result bits and the final output exponent bits.

14. The processing device of claim 1, wherein
the number of the first set of exponent bits is equal to a maximum number of the number of exponent bits in the first format and the number of exponent bits in the second format, and
the number of the first set of mantissa bits is equal to a maximum number of the number of mantissa bits in the first format and the number of mantissa bits in the second format.

15. The processing device of claim 1, wherein the first set of bits representing the first floating-point number, the second set of bits representing the second floating-point number, and the third set of bits representing the third floating-point number are included in an instruction.

16. The processing device of claim 1, wherein the first floating-point number, the second floating-point number, and the third floating-point number are floating-point tensors.

17. The processing device of claim 1, wherein the format conversion signal is triggered by a machine learning model.

18. The processing device of claim 17, wherein the processing circuitry is configured to cause:
performing an inference of the machine learning model by using the fourth set of bits representing the output floating-point number.

19. The processing device of claim 17, wherein the processing circuitry is configured to cause:

training the machine learning model by using the fourth set of bits representing the output floating-point number.

\* \* \* \* \*